(12) United States Patent
Torita

(10) Patent No.: US 11,475,396 B2
(45) Date of Patent: Oct. 18, 2022

(54) TRANSPORTATION SYSTEM AND TRANSPORT METHOD

(71) Applicant: Hideki Torita, Kanagawa (JP)

(72) Inventor: Hideki Torita, Kanagawa (JP)

(*) Notice: Subject to any disclaimer, the term of this patent is extended or adjusted under 35 U.S.C. 154(b) by 185 days.

(21) Appl. No.: 16/611,150

(22) PCT Filed: Apr. 26, 2018

(86) PCT No.: PCT/JP2018/016977
§ 371 (c)(1),
(2) Date: Nov. 5, 2019

(87) PCT Pub. No.: WO2018/207640
PCT Pub. Date: Nov. 15, 2018

(65) Prior Publication Data
US 2020/0082338 A1  Mar. 12, 2020

(30) Foreign Application Priority Data
May 8, 2017  (JP) .............................. JP2017-092676

(51) Int. Cl.
*G06Q 10/08* (2012.01)
*B61B 13/00* (2006.01)
(Continued)

(52) U.S. Cl.
CPC ........ *G06Q 10/08355* (2013.01); *B60L 50/60* (2019.02); *B61B 13/00* (2013.01);
(Continued)

(58) Field of Classification Search
CPC ......... G06Q 10/08355; G06Q 10/0832; G06Q 50/30; B60L 50/60; B61B 13/00
(Continued)

(56) References Cited

U.S. PATENT DOCUMENTS 3,759,187 A * 9/1973 Gayot ..................... B61B 13/00
104/130.07
5,451,133 A * 9/1995 Salsburg ................. B60L 15/38
414/908
(Continued)

FOREIGN PATENT DOCUMENTS

CA       2223448 C  *  6/2007  ............ B61L 23/002
JP       61-238596        10/1986
(Continued)

OTHER PUBLICATIONS

Singh et al., Truck Suspension Specification for Automobile Transport, Proceedings of IEEE/ASME Joint Railroad Conference, Jan. 1, 1994 (Year: 1994).*
(Continued)

*Primary Examiner* — Rupangini Singh
(74) *Attorney, Agent, or Firm* — Hamre, Schumann, Mueller & Larson, P.C.

(57) ABSTRACT

An object is to provide novel traffic system and transportation method capable of realizing door-to-door movement in a wide range by using a plurality of operation systems. A transfer box 100 capable of accommodating a passenger and/or freight, a plurality of operation systems 200 capable of transporting the transfer box 100, a transfer means 300 which transfers the transfer box 100 from one operation system 200 to another operation system 200, and a system management unit 400 which communicates with the plurality of operation systems 200 to manage a transportation status of the transfer box 100 are provided, in which the operation system 200 includes a transfer unit 210 on which the transfer box 100 is loaded, and an operation management unit 220 which manages an operation status of the transfer unit 210.

18 Claims, 21 Drawing Sheets

(51) Int. Cl.
  *G06Q 50/30* (2012.01)
  *B60L 50/60* (2019.01)
  *H02J 7/00* (2006.01)
  *H02J 50/00* (2016.01)

(52) U.S. Cl.
  CPC ......... *G06Q 10/0832* (2013.01); *G06Q 50/30* (2013.01); *H02J 7/00* (2013.01); *H02J 50/005* (2020.01)

(58) Field of Classification Search
  USPC ....................................................... 705/338
  See application file for complete search history.

(56) References Cited

U.S. PATENT DOCUMENTS

| | | | | |
|---|---|---|---|---|
| 9,519,882 | B2* | 12/2016 | Galluzzo | ................ B25J 9/1692 |
| 9,619,776 | B1* | 4/2017 | Ford | .................... B64C 39/024 |
| 2009/0248197 | A1* | 10/2009 | Boettcher | ............ B65G 63/025 |
| | | | | 700/218 |
| 2010/0104392 | A1* | 4/2010 | Bowen | ...................... B60P 3/08 |
| | | | | 410/26 |
| 2016/0104099 | A1* | 4/2016 | Villamar | ................ G06Q 50/28 |
| | | | | 705/26.81 |

FOREIGN PATENT DOCUMENTS

| | | | |
|---|---|---|---|
| JP | 2004-262622 | | 9/2004 |
| JP | 2004262622 A | * | 9/2004 |
| JP | 2005-075634 | | 3/2005 |
| JP | 2008-537709 | | 9/2008 |
| JP | 2012-240826 | | 12/2012 |
| WO | WO-03031247 A2 | * | 4/2003 ............... B61D 3/18 |

OTHER PUBLICATIONS

International Search Report issued in International Application No. PCT/JP2018/016977, dated Jul. 17, 2018, 3 pages with translation.

* cited by examiner

FIG. 3
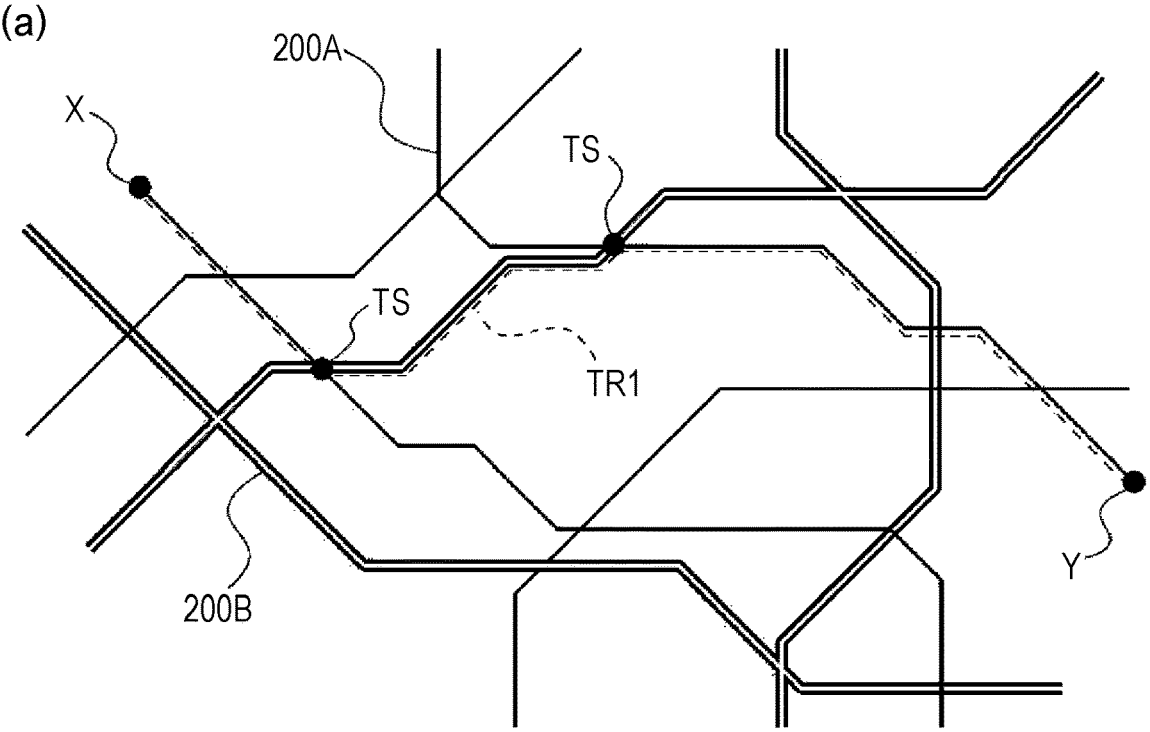
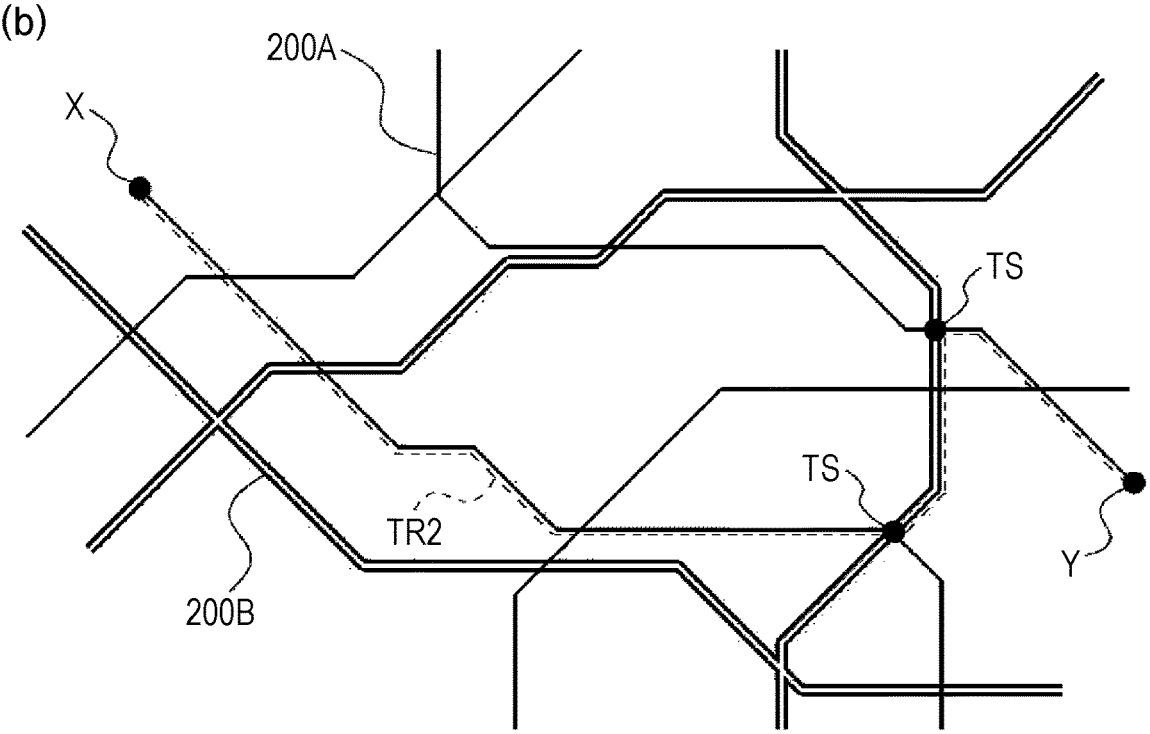

FIG. 10
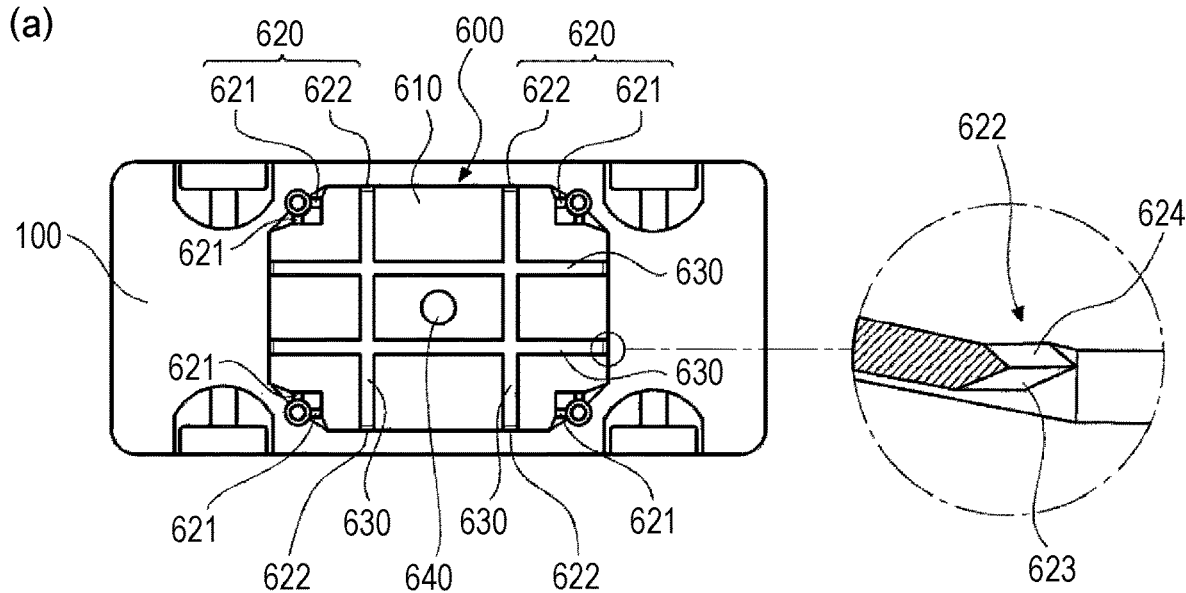
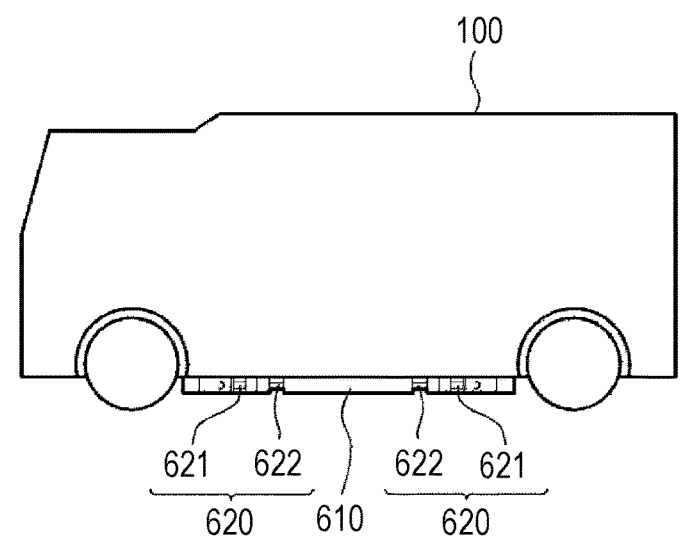

FIG. 12
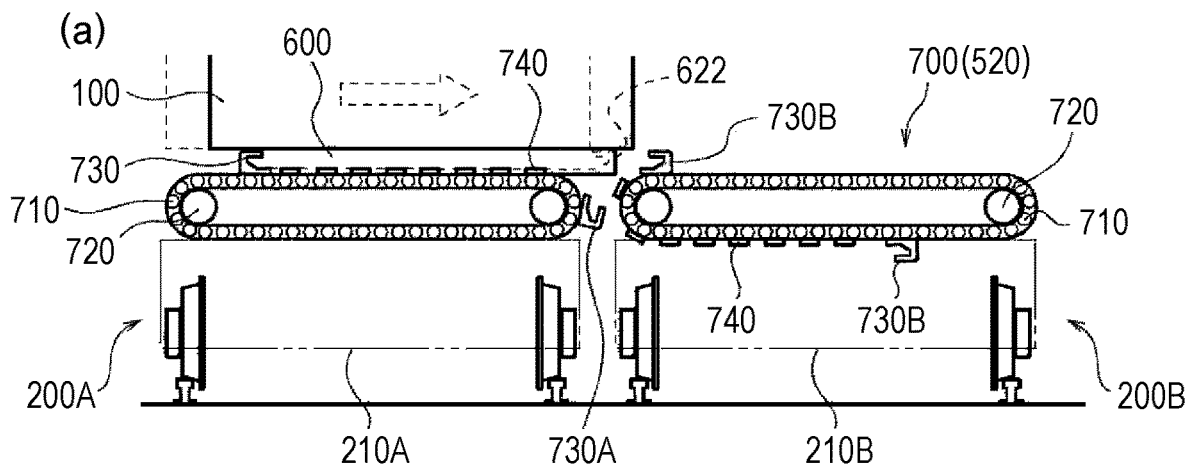
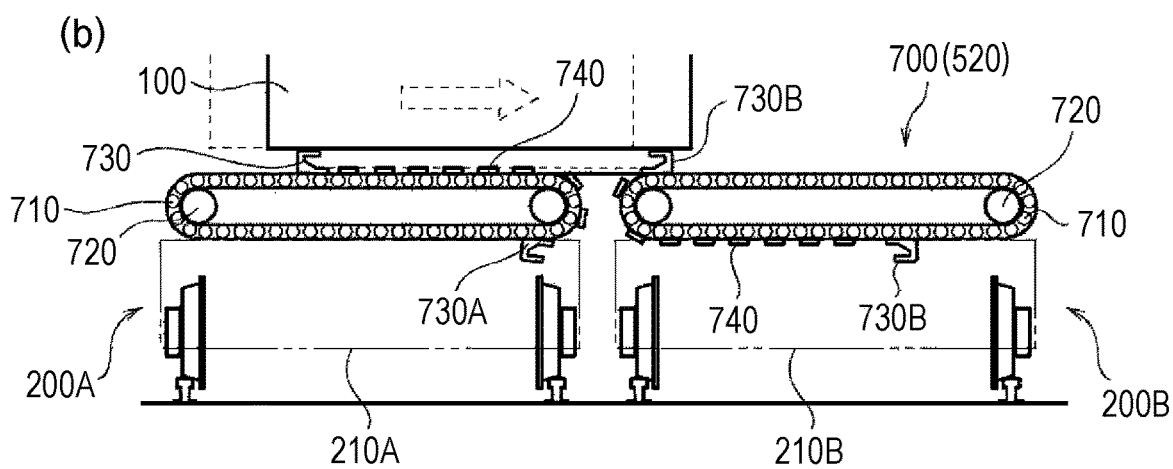
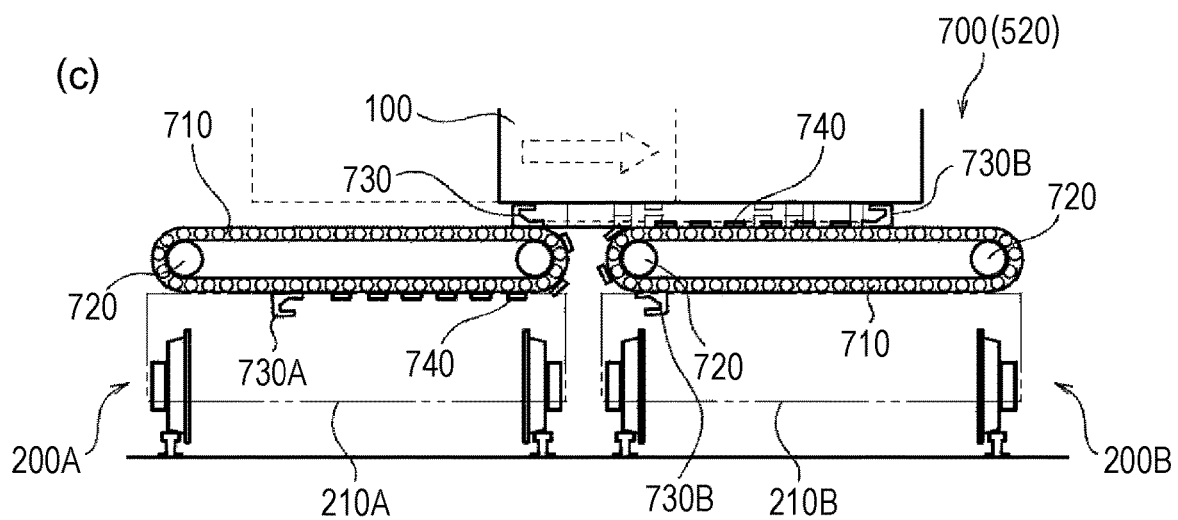

FIG. 16
(a) 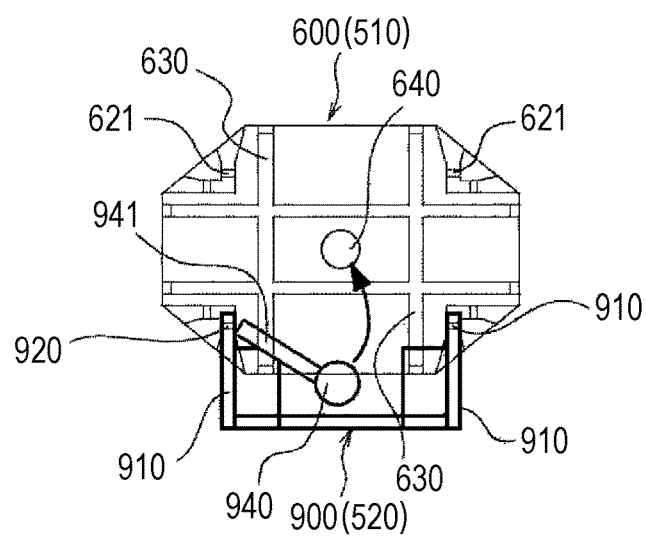
(b) 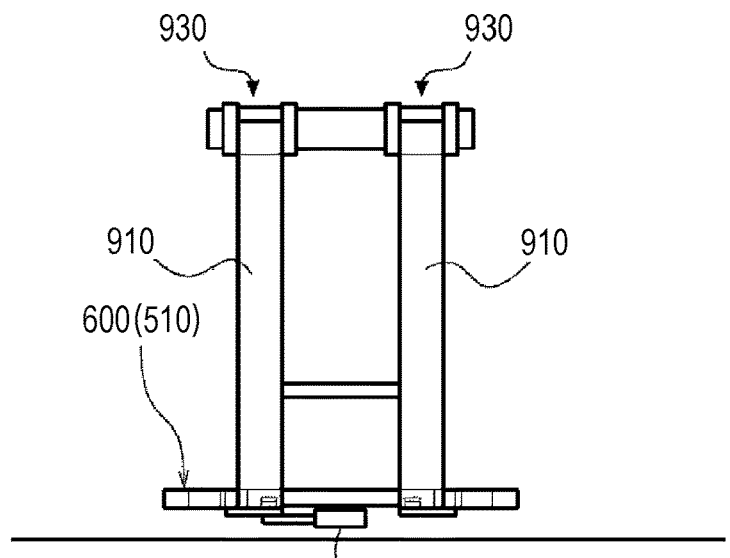
(c) 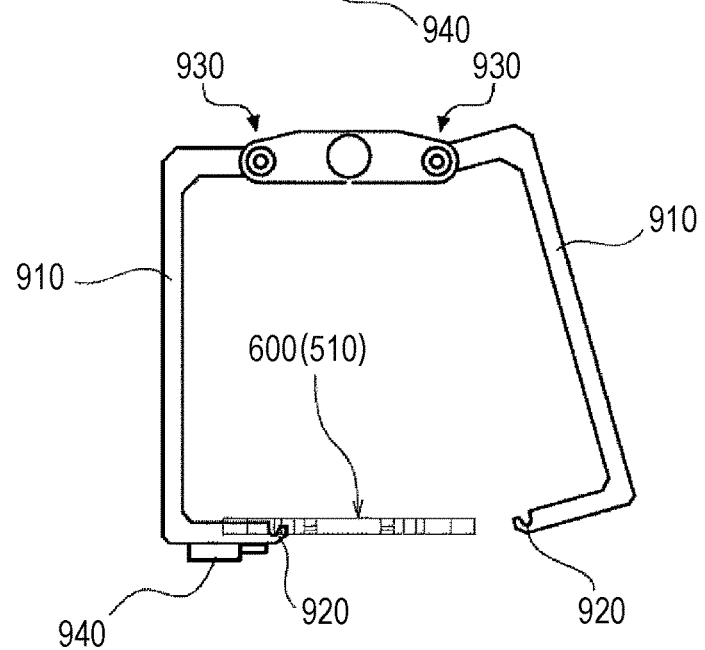

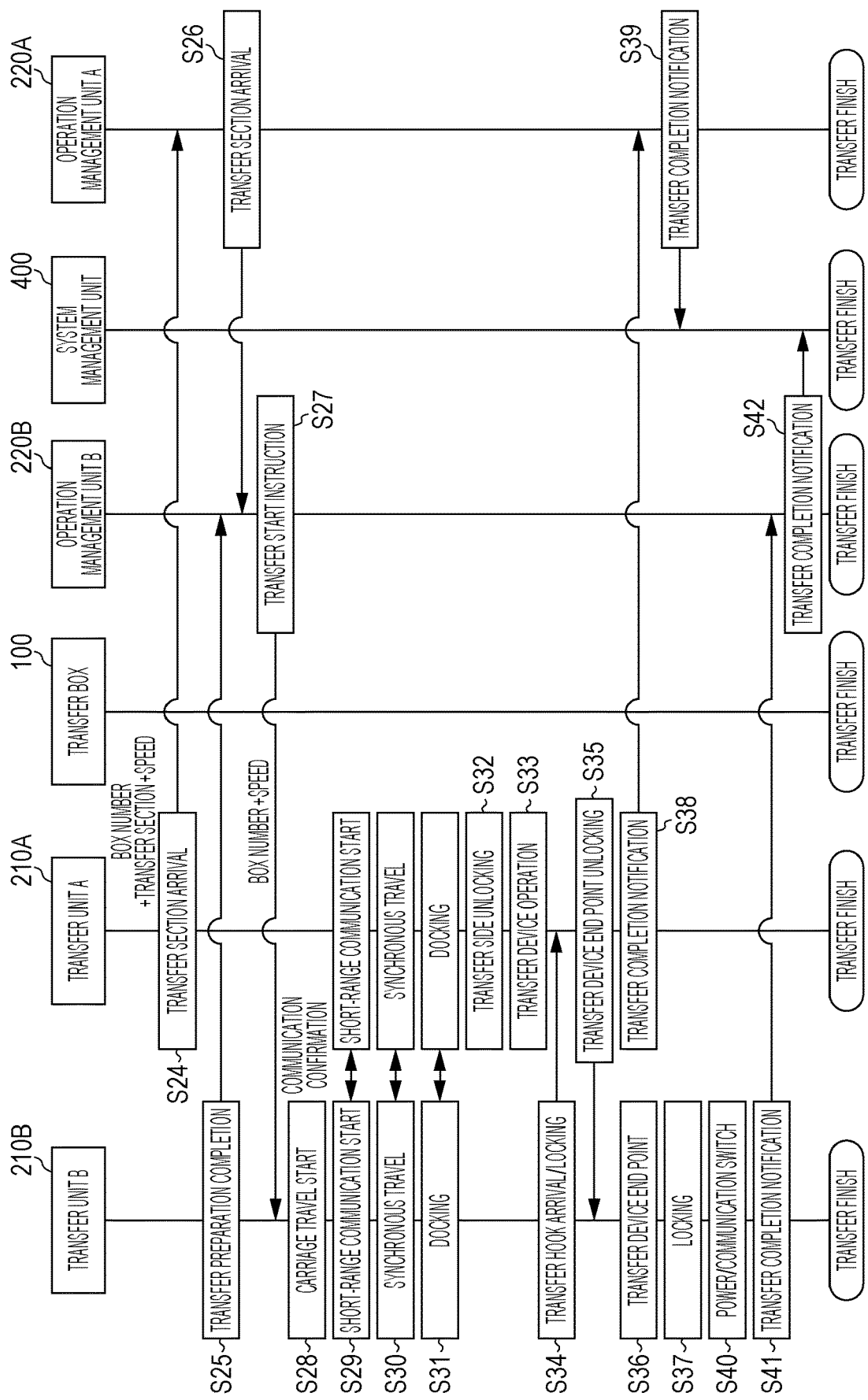

TRANSPORTATION SYSTEM AND TRANSPORT METHOD

TECHNICAL FIELD

The present invention relates to a traffic system and a transportation method of transporting a passenger and/or freight.

BACKGROUND ART

Conventionally, in the field of transportation, when transporting a passenger and/or freight over a long distance, it is common to have a transit point before a destination. For example, when a delivery company transports the freight, the freight is once sent to the transit point such as a wholesaler or a distribution center where transshipment operation is performed, and delivered to each destination point (refer to FIG. 8(a)). When the passenger uses transportation facilities, it is common to transfer at a transit point such as a station.

In contrast, as a transportation method without such a transit point, Patent Literature 1 discloses a tube network system for transporting door-to-door a passenger or freight. In this system, a configuration is adopted in which a tube network serving as a moving route to a destination point is arranged, and a tube vehicle travels in the tube network to perform door-to-door transportation.

CITATION LIST

Patent Literature

Patent Literature 1: JP 2008-537709 A

SUMMARY OF INVENTION

Technical Problem

There is an automobile as a general means capable of transporting door-to-door a passenger and freight. Conventionally, the automobile is required to be driven manually by the passenger, but research on an automatic driving technology is recently actively performed. This automatic driving technology is expected from a viewpoint of reducing a burden on a driver and effectively using a time. However, it is considered that there are still many problems to achieve fully automatic driving due to a situation of mixed travel with non-automatic driving vehicles and difficulty in adapting to surrounding environmental changes. From the viewpoint of improving a moving speed, it is difficult to increase a speed as high as that of the Shinkansen.

In contrast, in a railroad, a higher speed is required, and the linear Shinkansen is in the stage of practical use. The linear Shinkansen is expected to revitalize the economy by reducing a moving time. However, since the railroad including the Shinkansen is a transportation means of connecting stations of course, it is necessary to use other transportation means to move from a departure point such as home to the station, so that the movement to the destination point includes a transshipping step. For this reason, there is no door-to-door convenience like an automobile, and there is a situation in which it is burdensome both in labor and in time for a moving passenger, such as having to wait for a train while carrying baggage at a transfer point.

In that regard, in the system disclosed in Patent Literature 1, door-to-door transportation is possible from the departure point to the destination. In contrast, a moving range of the tube vehicle of Patent Literature 1 is limited to a range in which the tube network is arranged. For this reason, there is a problem that it takes a lot of cost and is not practical to arrange the tube network to reach a place where it is difficult to arrange the tube network (for example, the mountain or the sea) or a local place. In addition, it is not realistic from the viewpoint of cost and efficiency to construct high-speed operation such as the Shinkansen from a residential area with a single system.

Therefore, as a result of intensive studies on a system capable of realizing door-to-door transportation, the present inventor conceives of a novel traffic system capable of widening the movable range, reducing the burden to passengers, and shortening the moving time by using a plurality of operation systems (railroads, aircrafts, ships, trucks, ropeways, monorails, elevators, the linear Shinkansen, automatic driving vehicles and the like) in a cross-cutting manner.

The present invention is achieved in view of the above circumstances, and an object thereof is to provide novel traffic system and transportation method capable of realizing door-to-door movement in a wide range by using a plurality of operation systems.

It is another object of the present invention to provide a traffic system and a transportation method capable of reducing a burden on a passenger and reducing a moving time.

Solution to Problem

In order to solve the above problems, a traffic system according to the present invention is provided with a transfer box capable of accommodating a passenger and/or freight, a plurality of operation systems capable of transporting the transfer box, a transfer means which transfers the transfer box from one operation system to another operation system, and a system management unit which communicates with the plurality of operation systems to manage a transportation status of the transfer box, in which the operation system includes a transfer unit on which the transfer box is loaded, and an operation management unit which manages an operation status of the transfer unit.

The traffic system according to the present invention is provided with the plurality of operation systems capable of transporting the transfer box in which the passenger and/or freight is accommodated, the transfer means which transfers the transfer box from one operation system to another operation system, and the system management unit which communicates with the plurality of operation systems to manage the transportation status of the transfer box, so that the transfer box may move while changing the plurality of operation systems. As a result, the passenger and freight accommodated in the transfer box may be moved door-to-door from a departure point to a destination point, thereby reducing a burden on the passenger and shortening a moving time.

In a preferred mode of the present invention, the transportation status is information including a transportation route of the transfer box.

In a preferred mode of the present invention, the transfer unit includes a transfer unit connection means which connects to another transfer unit.

By including the transfer unit connection means which connects the transfer units in this manner, the transfer box may be transferred more safely and quickly.

In a preferred mode of the present invention, the system management unit includes an operation status obtaining means which obtains the operation status, a transportation route creation means which creates the transportation route of the transfer box, and an operation system reservation means which reserves the operation system used on the transportation route.

In this manner, since the system management unit includes the operation system reservation means which reserves the operation system, the transfer box may be transferred efficiently, and the moving time may be shortened.

In a preferred mode of the present invention, the system management unit includes a content information selection means which selects content information based on user information of a user who uses the transfer box, and provides the content information to the user.

In this manner, by providing the content information based on the user information to the user, it is possible to guide the user to a more interesting place.

In a preferred mode of the present invention, the system management unit includes a content reservation means which reserve content based on the content information.

By including the content reservation means in this manner, the user may easily reserve the content and may effectively use the moving time.

A preferred mode of the present invention further includes a docking mechanism which connects the transfer box to the transfer unit, in which the docking mechanism includes a docking plate provided in the transfer box, and a docking unit provided in the transfer unit and connected to the docking plate.

In this manner, by adopting the docking plate in the docking mechanism, the transfer box may be easily manufactured simply by attaching the docking plate.

In a preferred mode of the present invention, the docking plate includes a plate main body, a docking unit connection means provided on a peripheral edge of the plate main body, and a guide groove provided on a surface of the plate main body, and
  the docking unit includes a docking plate connection means connected to the docking unit connection means, and a convex portion which fits into the guide groove.

In this manner, by including the guide groove and the convex portion which fits into the guide groove, relative positions of the docking plate and the docking unit may be positioned and they may be accurately connected.

In a preferred embodiment of the present invention, at least a pair of docking unit connection means is arranged in front and rear symmetrical positions in a horizontal direction of the plate main body.

In a preferred embodiment of the present invention, at least a pair of docking unit connection means is arranged in right and left symmetrical positions in a longitudinal direction of the plate main body.

In a preferred mode of the present invention, the docking unit connection means is a columnar connection unit formed into a columnar shape.

In a preferred mode of the present invention, the docking unit includes a conveyor belt capable of transferring the transfer box.

In a preferred mode of the present invention, the docking unit includes a rotating body capable of transferring the transfer box.

In a preferred mode of the present invention, the docking unit includes an arm unit capable of suspending the transfer box.

In a preferred mode of the present invention, the docking unit is provided with a power transmission means, and the docking plate is provided with a power reception means.

In a preferred mode of the present invention, the docking plate is further provided with an electricity storage means which stores electricity.

In a preferred mode of the present invention, the transfer box includes a moving wheel capable of self-propelling.

In this manner, by configuring the transfer box itself to be movable, door-to-door movement may be realized over a wide range.

A transportation method according to the present invention is a transportation method of transporting the transfer box from a departure point to a destination point via the plurality of operation systems, the method provided with
  a route calculating step of calculating a transportation route of the transfer box,
  a transfer reserving step of reserving the operation system used on the transportation route, and
  a transferring step of transferring the transfer box.

According to the transportation method of the present invention, the passenger and freight accommodated in the transfer box may be moved door-to-door from the departure point to the destination point, thereby reducing a burden on the passenger and shortening a moving time.

In a preferred mode of the present invention, the transferring step includes a coupling step of coupling one transfer unit with another transfer unit.

As described above, the transfer box may be transferred more safely by including the coupling step.

In a preferred mode of the present invention, at the transferring step, the transfer box is transferred while the transfer units travel.

In this manner, by performing the transferring step while traveling, the transfer time may be further shortened.

Advantageous Effects of Invention

According to the present invention, it is possible to provide a novel traffic system capable of realizing door-to-door movement by using a plurality of operation systems.

According to the present invention, it is also possible to provide a traffic system capable of reducing a burden on a passenger and reducing a moving time.

BRIEF DESCRIPTION OF DRAWINGS

FIG. 3 is a view of a usage example of the traffic system according to one embodiment of the present invention.

FIG. 10 is an external view of the docking plate in one embodiment of the present invention.

FIG. 12 is a view illustrating a transfer state of the transfer box in one embodiment of the present invention.

FIG. 16 is a view illustrating an example of the docking unit in one embodiment of the present invention.

FIG. 22 is a view illustrating a transferring step in the transportation method according to the present invention in detail.

DESCRIPTION OF EMBODIMENTS

Figure 1:
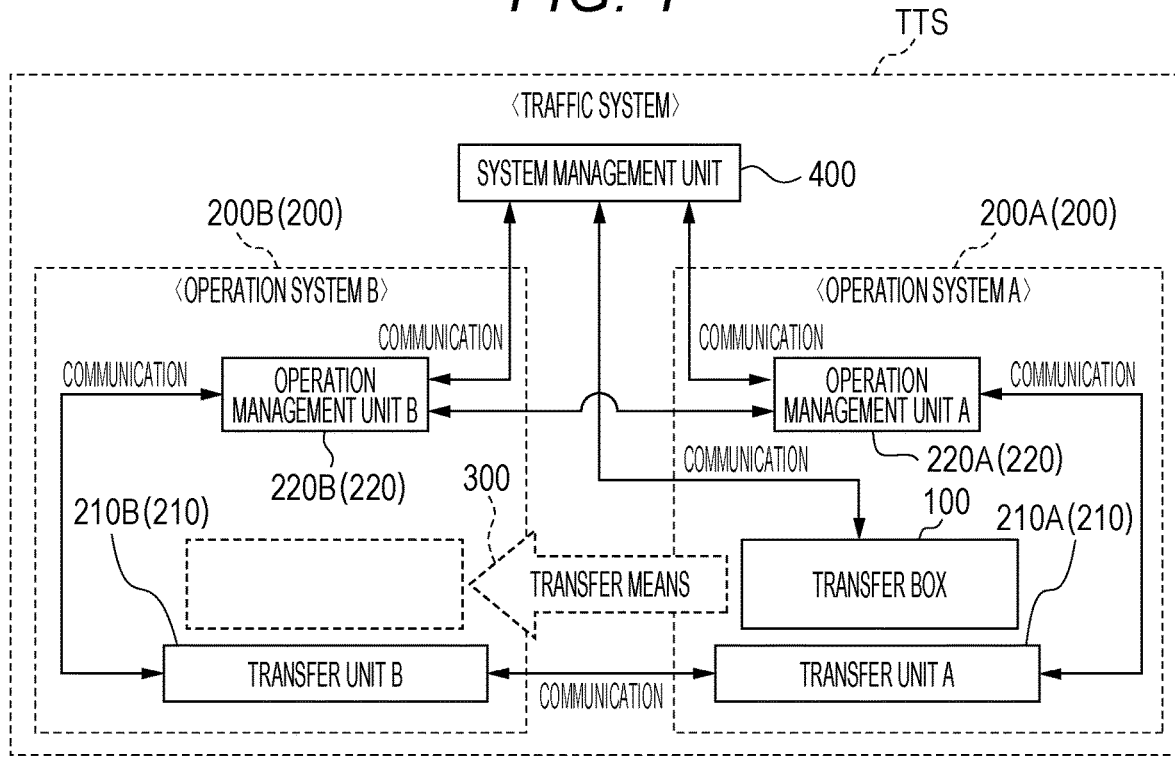
FIG. 1 is a schematic diagram of a traffic system according to one embodiment of the present invention.

A preferred embodiment illustrated in the drawings of the present invention is hereinafter described in detail with reference to FIGS. 1 to 22. The technical scope of the present invention is not limited to the embodiment illustrated in the accompanying drawings, and may be appropriately changed within the scope recited in claims.

<Configuration and Function of Traffic System According to the Present Invention>

FIG. 1 is a schematic diagram illustrating an overview of a traffic system TTS according to the present invention. As illustrated in FIG. 1, the traffic system TTS according to the present invention is provided with a transfer box 100 capable of accommodating a passenger and/or freight, a plurality of operation systems 200 capable of transporting the transfer box 100, a transfer means 300 which transfers the transfer box 100 from one operation system 200 to another operation system 200, and a system management unit 400 which communicates with the plurality of operation systems 200 (and/or the transfer box 100) to manage a transportation status of the transfer box 100.

The transportation status of the transfer box 100 herein includes transportation route TR information from a departure point X to a destination point Y of the transfer box 100, transfer section TS information of a section in which the transfer is performed on the transportation route TR, time information of arrival at each transfer section TS, current position information of the transfer box 100 and the like.

Note that, in FIG. 1, <operation system A> indicates an operation system 200A before the transfer on which the transfer box 100 is loaded. <Operation system B> indicates an operation system 200B to which the transfer box 100 is transferred.

The operation system 200 includes a transfer unit 210 on which the transfer box 100 may be loaded, and an operation management unit 220 which manages an operation status of the transfer unit 210.

Specific examples of the operation system 200 may include an independent company such as a railroad company which manages operation of a railroad or a shipping company, an elevator system built in a building and the like. The operation system 200 may operate independently of the traffic system TTS, and the operation system 200 is responsible for entire operation management and control of lines thereof. Therefore, even if the traffic system TTS goes down, the operation itself of the operation system 200 is not affected. However, the operation status is reported to the traffic system TTS.

The transfer unit 210 is a transporting machine capable of transporting the transfer box 100 loaded thereon. For example, examples may include a vehicle (train, the Shinkansen, the linear Shinkansen, truck, automatic driving vehicle and the like), an aircraft, a ship (large ship, small ship, hovercraft, automatic driving ship and the like), a ropeway, an elevator, a monorail and the like.

That is, the transporting machine which operates on a fixed track such as a railroad such as the train and the Shinkansen, the transporting machine which operates on a fixed route such as a bus, and the transporting machine which comes and goes between fixed stops such as the elevator and a ferry may be adopted as the transfer unit 210.

The operation management unit 220 communicates with one or a plurality of transfer units 210 to manage the operation status of each transfer unit 210.

The operation status herein includes a current position and a route, departure and destination points, departure and arrival times at stop points, track information indicating which track to enter and the like of the transfer unit 210.

Figure 2:
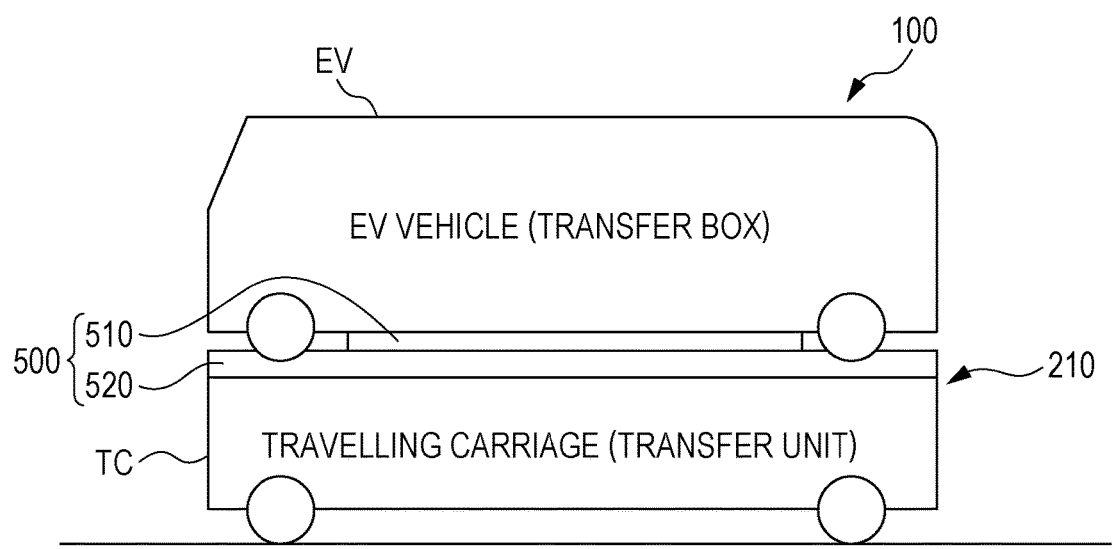
FIG. 2 is a view illustrating an example of a transfer box and a transfer unit in one embodiment of the present invention.

FIG. 2 is a schematic diagram illustrating the transfer unit 210 on which the transfer box 100 is loaded. FIG. 2 illustrates a state in which an EV vehicle EV (an example of the transfer box 100) is loaded on a traveling carriage TC (an example of the transfer unit 210), and a docking mechanism 500 is provided between the EV vehicle EV and the traveling carriage TC.

The docking mechanism 500 is provided with a docking plate 510 provided on a side of the transfer box 100 and a docking unit 520 provided on a side of the transfer unit 210.

In this manner, by providing the docking mechanism 500 between the transfer box 100 and the transfer unit 210, a docking portion may be standardized. As a result, even when a shape and a form of the transfer box 100 are different or when a configuration of the transfer unit 210 is different, the transfer box 100 may be transferred smoothly.

FIG. 3 illustrates a state in which an operation network of the operation system 200A and an operation network of the operation system 200B are overlapped. Herein, a section in which the operation networks intersect with (or are adjacent to) each other is used as the transfer section TS in which the transfer box 100 may be transferred. Therefore, a plurality of transportation routes TR may be selected for movement from the departure point X to the destination point Y.

For example, it is possible to select an optimal transportation route TR according to a situation by changing the transfer section TS such as a transportation route TR1 illustrated in FIG. 3(a) and a transportation route TR2 illustrated in FIG. 3(b).

Figure 4:
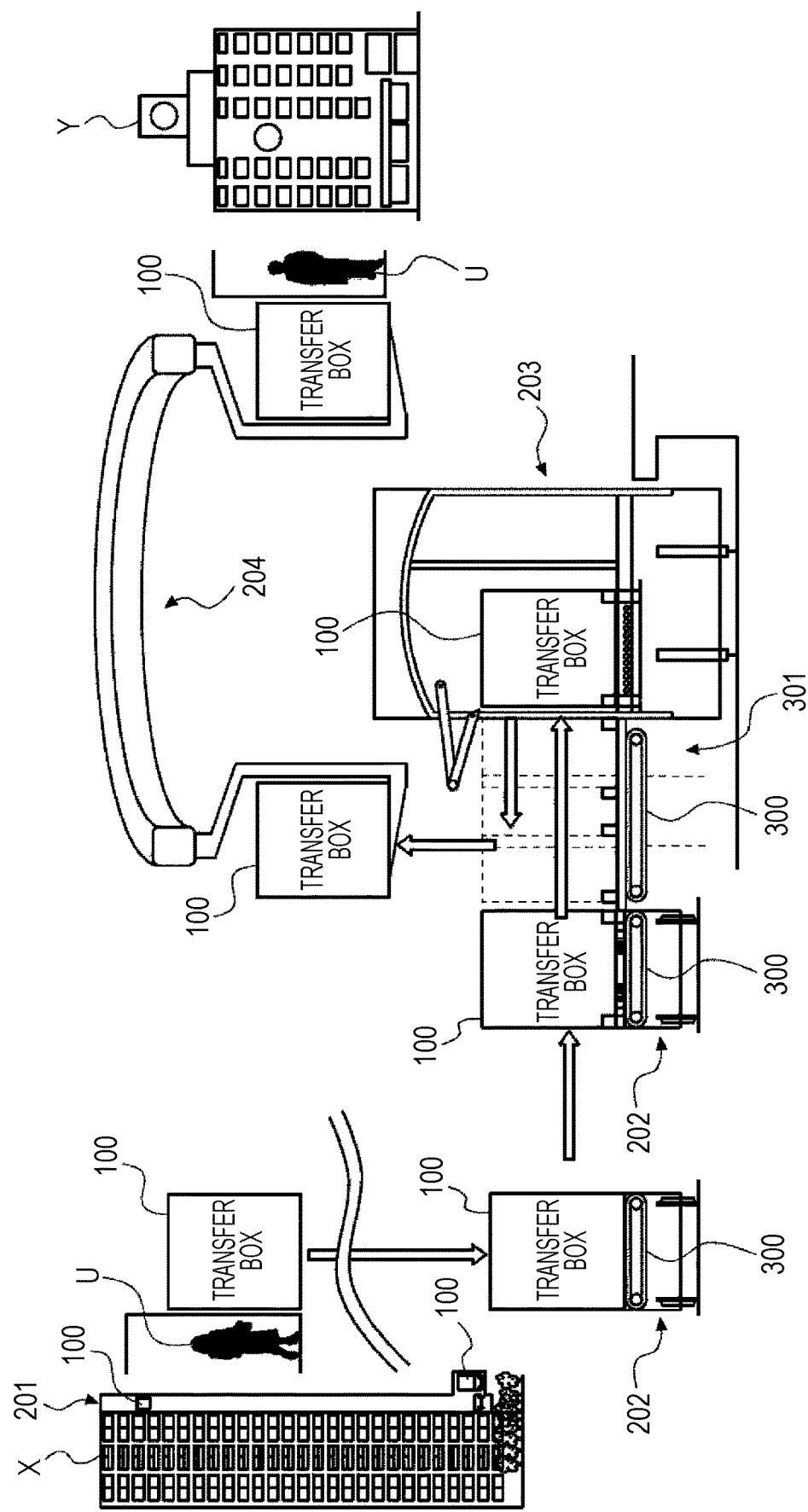
FIG. 4 is a view of a usage example of the traffic system according to one embodiment of the present invention.

FIG. 4 illustrates a state in which the transfer box 100 is moved door-to-door from the departure point X to the destination point Y using a plurality of operation systems 201 to 204.

First, the transfer box 100 accepts a contact from a user U and is transported to the departure point X. FIG. 4 illustrates a state in which the transfer box 100 is transported to the front of an apartment of the user U living upstairs of an apartment house by the operation system 201 such as an elevator or a conveyor.

Then, after loading the passenger and freight at the departure point X, this is transported downstairs by the elevator which is the first operation system 201. After that, this is transferred to a railroad-type traveling carriage which is the second operation system 202, reaches the Shinkansen station which is the third operation system 203, and transferred into the Shinkansen via a transfer platform 301 and the like including the transfer means 300. Next, this is transferred to a monorail which is the fourth operation system 204 and transported to the destination point Y.

In this manner, since the transfer box 100 is transported while transferring to a plurality of operation systems 200, it is possible to realize door-to-door movement without transshipment of the passenger or freight.

Note that, the transfer means 300 used for transferring the transfer box 100 such as the transfer platform 301 may be provided between the operation systems 200. Although FIG. 4 illustrates the transfer platform 301 including a conveyor belt, a conventional transfer means such as a suspension type such as a crane may be adopted.

Figure 5:
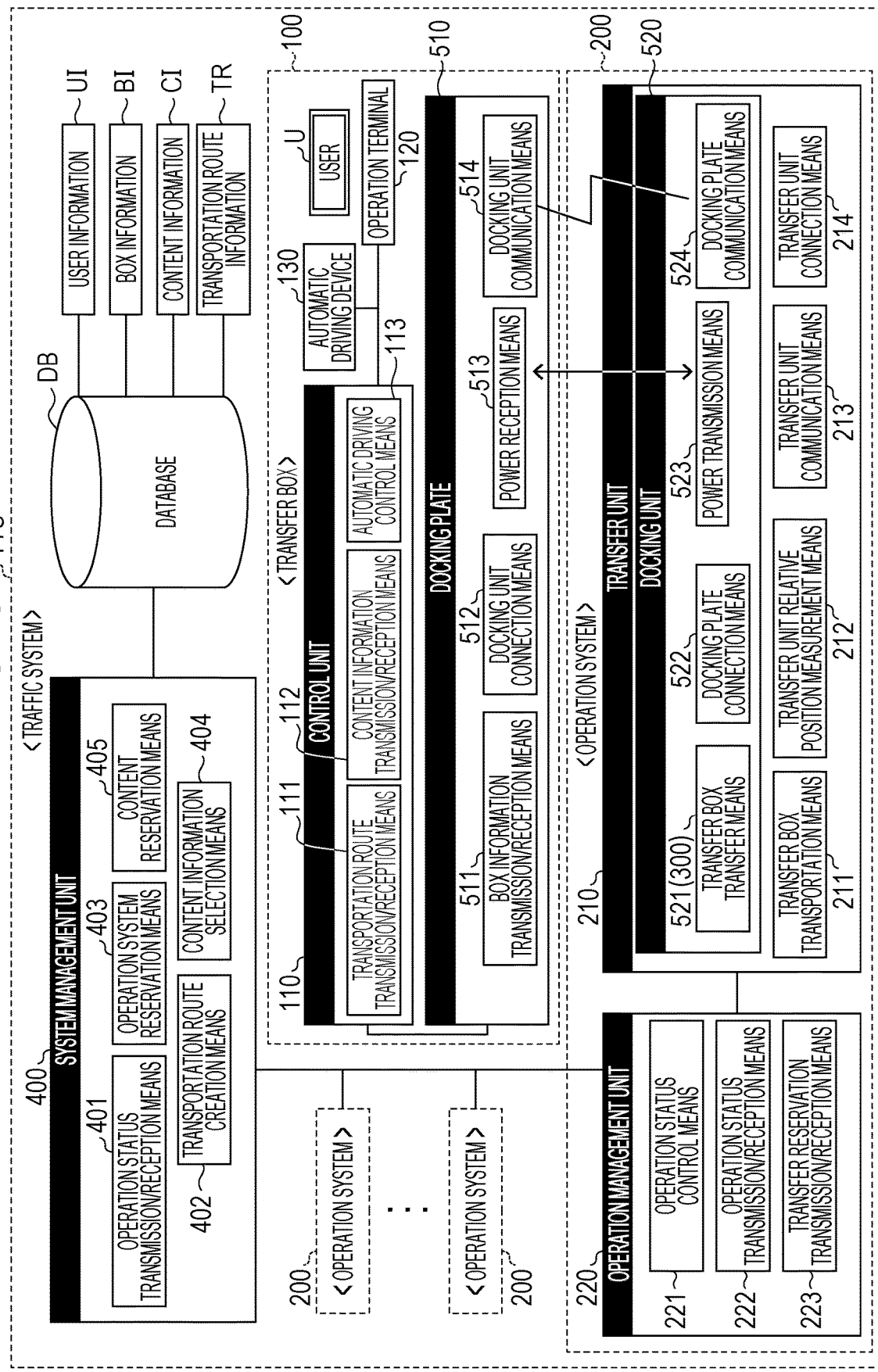
FIG. 5 is a functional block diagram of the traffic system according to one embodiment of the present invention.
Figure 6:
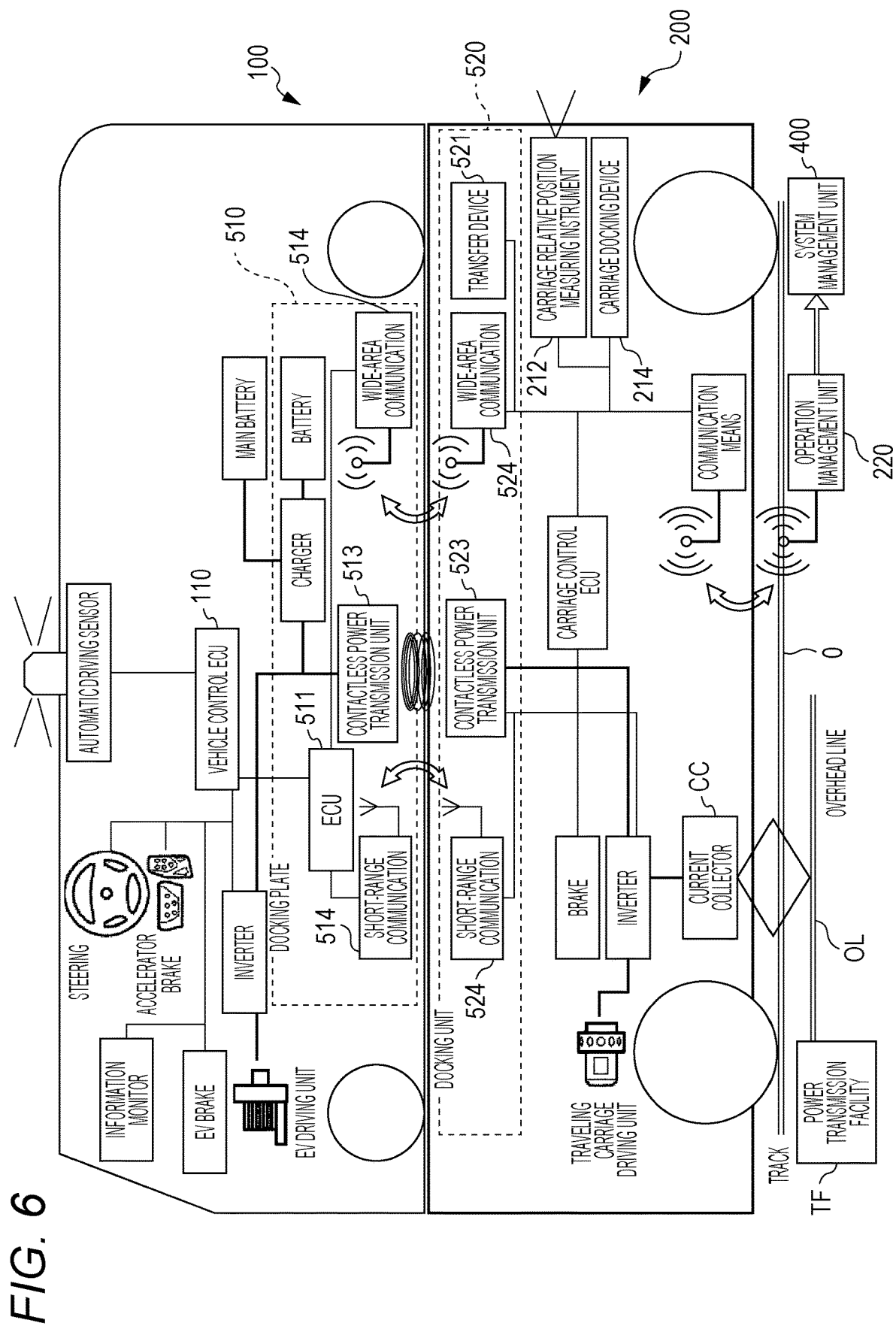
FIG. 6 is a view illustrating an example of a configuration of the transfer box and the transfer unit in one embodiment of the present invention.
Figure 7:
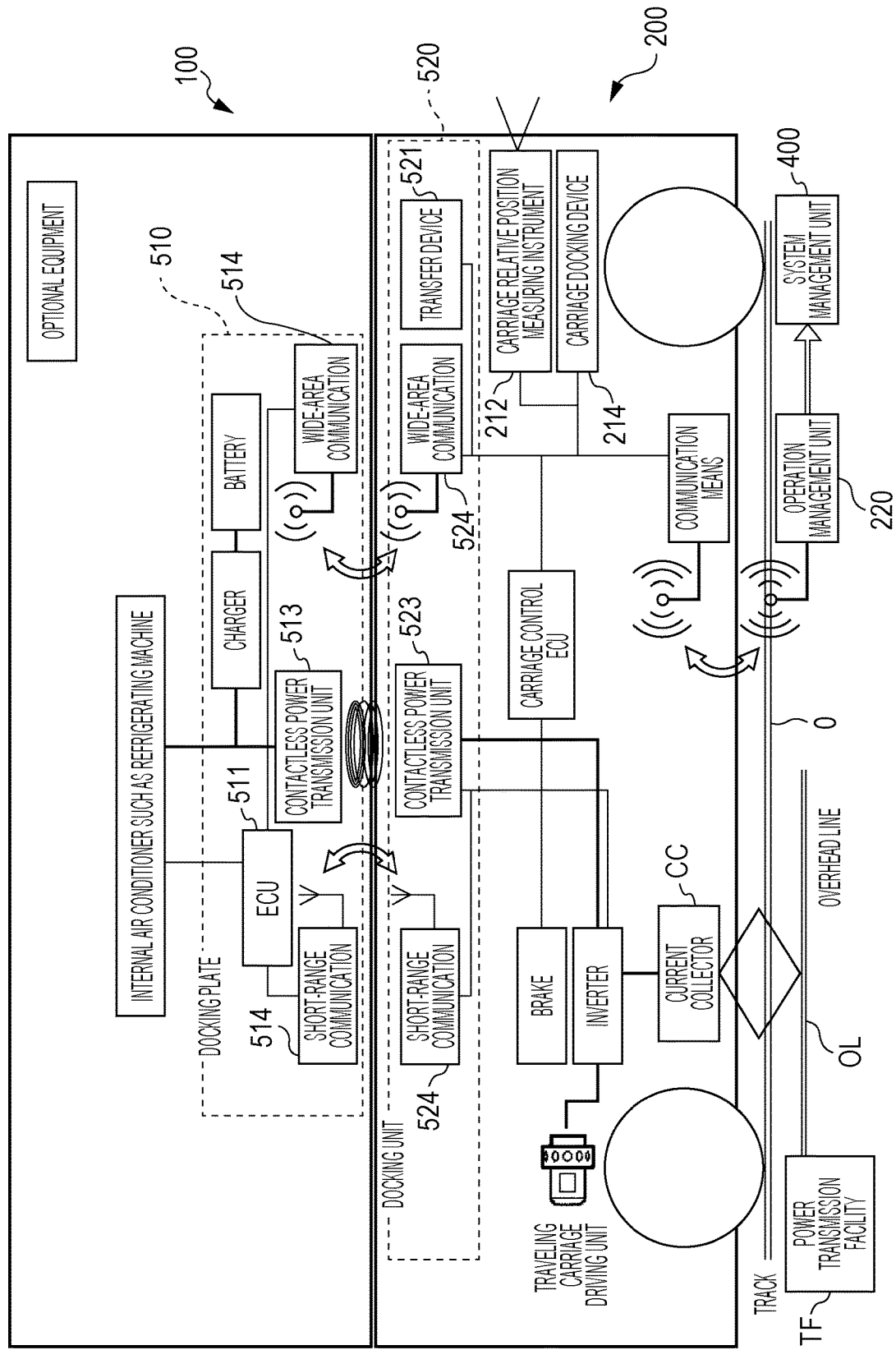
FIG. 7 is a view illustrating an example of the configuration of the transfer box and the transfer unit in one embodiment of the present invention.

Next, each configuration is described in detail with reference to FIGS. 5 to 7. FIG. 5 is a functional block diagram for explaining a function of each configuration. FIG. 6 is a view illustrating a specific configuration when the transfer box 100 is an EV vehicle with an automatic driving function. FIG. 7 is a view illustrating a specific configuration when the transfer box 100 is a container.

As illustrated in FIG. 5, the transfer box 100 is provided with a control unit 110, an operation terminal 120 which the user U may operate, an automatic driving device 130, and the docking plate 510. Note that, FIG. 5 illustrates an example in which the transfer box 100 is the EV vehicle with the automatic driving function.

In addition, examples of the transfer box 100 may include a container used for transporting the freight and a box used for transporting the passenger, a container with an automatic driving function (auto-pilot container), a box with an automatic driving function (auto-pilot box) and the like obtained by adding the automatic driving function thereto.

An outer shape of the transfer box 100 is desirably standardized (unified) to a size of a small car. For example, the transfer box 100 is set to have a total length of 3.8 m or shorter, a total width of 1.7 m or shorter, and a total height of 2.0 m or shorter. By standardizing the size of the transfer box 100 in this manner, this may be easily handled in different operation systems 200. In addition, by setting the same to have such a size, it is possible to install a compact and inexpensive dedicated line even when the dedicated line is newly installed.

The control unit 110 is provided with a transportation route transmission/reception means 111 which transmits/receives the transportation route TR, a content information transmission/reception means 112 which transmits/receives content information CI, and an automatic driving control means 113.

The transportation route transmission/reception means 111 may receive a plurality of transportation route TR candidates presented as candidates by the system management unit 400, or transmit the transportation route TR selected by the user U to the operation management unit 220 or the system management unit 400. The transportation route TR herein mentioned includes a transportation route of the transfer box 100, information on the operation system 200 to be used, a transportation time, information on the transfer section TS in which the transfer is performed and the like.

The content information transmission/reception means 112 may receive the content information CI selected by the system management unit 400 based on the transportation route TR and a current location and may request the content information CI desired by the user U from the system management unit 400.

Herein, examples of the content information CI may include popular inns, restaurants, sightseeing spots, and commercial facilities, and advertisements for them, the information mainly associated with an area.

The content information CI may provide real-time tourist information according to a moving position, and may be displayed and guided in other languages.

The operation terminal 120 is provided in the transfer box 100 so that the user U may operate, and the user U may perform operation of confirming, inputting, changing, and selecting the transportation route TR and the content information CI.

Note that the operation terminal 120 is not necessarily provided in the transfer box 100, and it is also possible to communicate from any terminal outside the transfer box 100 such as in the home and company via the Internet and the like.

The automatic driving device 130 is intended to mean wheels or sensors driven by the automatic driving control means 113, and the transfer box 100 itself is configured to be able to travel. Specific examples of the automatic driving device 130 may include an automatic driving sensor, a vehicle control electronic control unit (ECU), a battery (electricity storage means), an inverter, a manual operation steering wheel, an accelerator, a brake, a driving unit, an information monitor and the like as illustrated in FIG. 6.

In contrast, it is of course possible to adopt a container or a box for freight without the wheels, sensors and the like as the transfer box 100.

FIG. 7 illustrates an example in which the container for freight is adopted as the transfer box 100 provided with an internal air conditioner such as a refrigerating machine. This container may also be provided with optional equipment such as a freezer suitable for the freight to be transported. It is of course possible to adopt a simple box without providing anything in the container.

The docking plate 510 includes a box information transmission/reception means 511 which transmits/receives box information BI, a docking unit connection means 512 which connects to the docking unit 520, a power reception means 513 which receives electricity supplied from the docking unit 520, and a docking unit communication means 514 which communicates with the docking unit 520.

Therefore, the docking plate 510 is desirably provided with an electronic control unit (ECU; an example of the box information transmission/reception means 511), a charger, a battery (electricity storage means), a contactless power transmission unit (an example of the power reception means 513; a contact type is also possible), a wide-area communication device and a short-range communication device (an example of the docking unit communication means 514) and the like (refer to FIG. 6 and FIG. 7).

The box information transmission/reception means 511 may receive the box information BI from the system management unit 400 and transmit the box information BI edited by the user U to the system management unit 400.

The box information BI is herein intended to mean information mainly associated with the transfer box 100 including destination information and current position information of the transfer box 100, unique number information (box number), user information UI such as the passenger and/or freight accommodated, payment information to each operation system, past usage history and the like.

The operation system 200 is provided with the transfer unit 210 on which the transfer box 100 may be loaded, and the operation management unit 220 which manages the operation status of the transfer unit 210 as described above.

The transfer unit 210 includes a transfer box transportation means 211 which transports the transfer box 100, a transfer unit relative position measurement means 212 which measures a relative position with respect to another transfer unit 210, a transfer unit communication means 213 which communicates with another transfer unit 210, and a transfer unit connection means 214 which connects to another transfer unit 210.

Examples of the transfer unit 210 may include a vehicle such as a traveling carriage and a train, an aircraft, a ship, a monorail, a ropeway, an elevator and the like.

For example, a traveling carriage TC which travels on a track O as illustrated in FIG. 6 and FIG. 7 is a carriage which travels with electricity supplied from a power transmission facility TF to a current collector CC via an overhead line OL and is desirably provided with a carriage control electronic control unit (ECU), a battery (electricity storage means), an inverter, a brake, a driving unit (transfer box transportation means 211), a carriage relative position measuring instrument (transfer unit relative position measurement means 212), a communication means (transfer unit communication means 213) which communicates with the operation management unit 220 and another transfer unit 21, a carriage docking device (transfer unit connection means 214) and the like.

As illustrated in FIG. 6 or FIG. 7, the transfer unit 210 is supplied with electricity from the overhead line OL connected to the power transmission facility TF.

The communication means of the transfer unit 210 desirably communicates with the system management unit 400 via a wired network provided on the track O, but this may also communicate via a wireless network such as the Internet. Furthermore, it is also possible to directly communicate via a wireless communication means provided on another transfer unit 210.

The docking unit 520 includes a transfer box transfer means 521 (transfer means 300) which transfers the transfer box 100 to another transfer unit 210, a docking plate connection means 522 which connects to the docking plate 510, a power transmission means 523 which supplies electricity to the docking plate 510, and a docking plate communication means 524 which communicates with the docking plate 510.

Therefore, the docking unit 520 is desirably provided with a transfer device (transfer box transfer means 521), a contactless power transmission unit (power transmission means 523; contact type is also possible), a short-range communication device and a wide-area communication device (docking plate communication means 524) and the like (refer to FIG. 6 or 7).

Note that examples of the transfer box transfer means 521 (transfer means 300) may include a conveyor type, a slide type, a suspension type and the like to be described later (refer to FIGS. 10 to 15).

The operation management unit 220 is provided with an operation status control means 221 which controls the operation status of the transfer unit 210, an operation status transmission/reception means 222 which transmits/receives the operation status of the transfer unit 210, and a transfer reservation transmission/reception means 223 which transmits/receives a transfer reservation of the transfer box 100.

The operation status is herein intended to mean information including position information (departure/arrival time) of the transfer unit 210, route information indicating which route the transfer unit 210 enters, type information of the transfer unit 210 (local, limited express, freight and the like) and the like.

The transfer reservation herein includes information of the transfer section TS in which the transfer box 100 transfers, date and time of the transfer, the transfer unit 210 to be transferred and the like.

The system management unit 400 is provided with an operation status transmission/reception means 401 which transmits/receives the operation statuses of a plurality of operation systems 200, a transportation route creation means 402 which sets the transportation route TR of the transfer box 100, an operation system reservation means 403 which reserves the operation system 200 used on the transportation route TR, a content information selection means 404 which selects the content information CI provided to the transfer box 100, and a content reservation means 405 which reserves content.

This system management unit 400 communicates with the database DB, and may extract to use the user information UI, box information BI, content information CI, and transportation route information TR included in the database DB, and may store newly obtained information.

The operation status transmission/reception means 401 is a function of obtaining each operation status of a plurality of operation systems 200 in real time.

The transportation route creation means 402 is a function of creating the transportation route TR candidates of the transfer box 100 based on the operation status and the box information BI.

The operation system reservation means 403 is a function of reserving the operation system 200 used on the transportation route TR selected by the user U.

The content information selection means 404 is a function of selecting the content information CI based on the user information UI of the user U who uses the transfer box 100 and providing the user U with the content information CI.

According to the traffic system TTS according to the present invention, by constructing a system in which the transfer box 100 may move across a plurality of operation systems 200, it is possible to realize door-to-door movement and reduce a burden on the passenger and shorten a moving time. That is, the passenger or freight accommodated in the transfer box 100 at the departure point X may arrive at the destination point without moving from the transfer box 100.

As a result, it is possible to reduce a waiting time due to connection and a burden of moving while carrying a baggage conventionally occurred when the passenger moves. From a point of view of a transporter, it is possible to deliver packages directly to the destination point without a trouble of transshipping a large amount of freight at a transit point.

Figure 8:
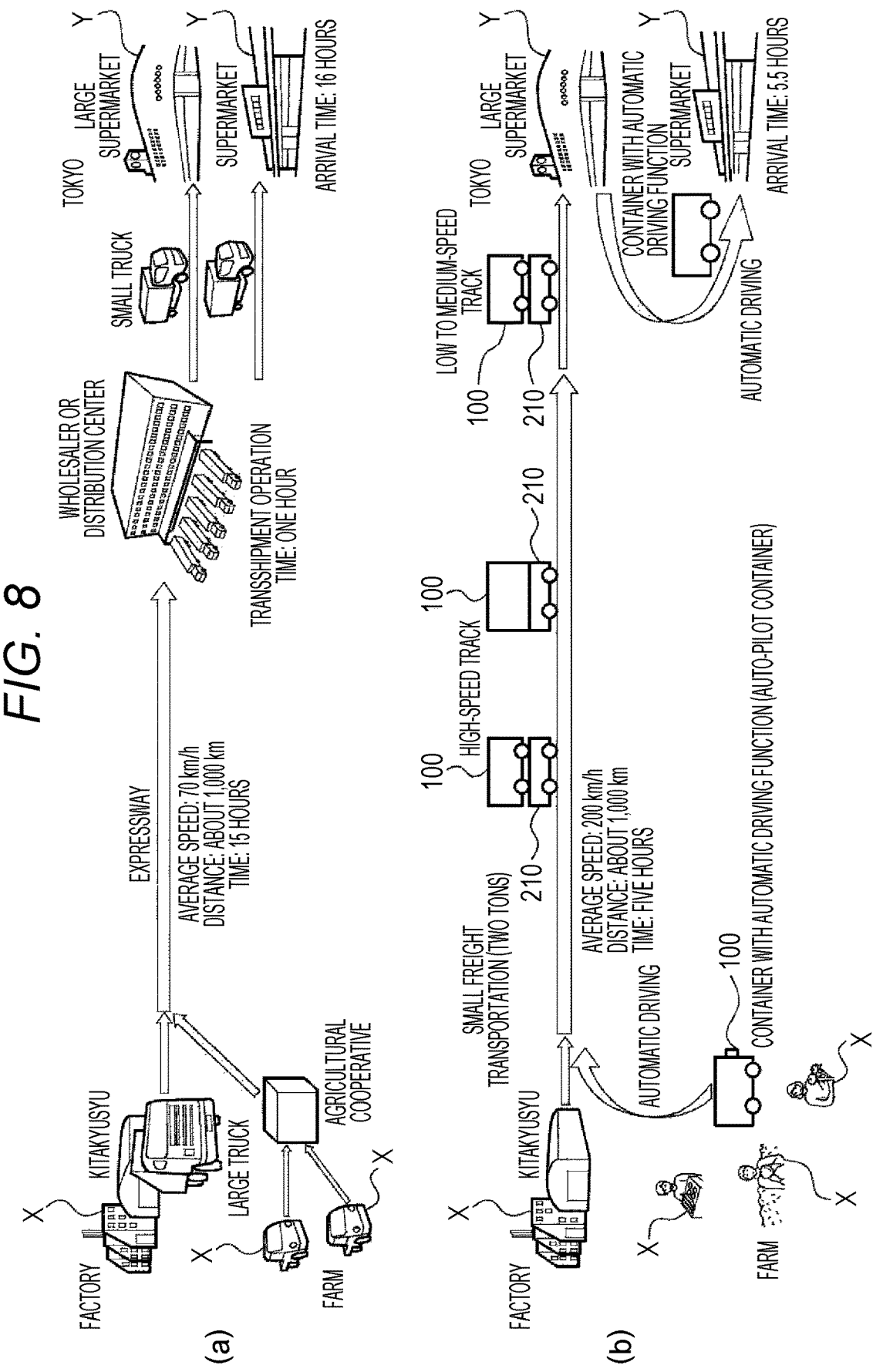
FIG. 8 is a view illustrating comparison in moving time between a conventional traffic system and the traffic system according to one embodiment of the present invention.

FIG. 8 illustrates a state of transporting crops collected at a farm in Kitakyushu (departure point X) to a supermarket in Tokyo (destination point Y). FIG. 8(a) illustrates a conventional transportation procedure in which it is common to perform transshipment operation at a wholesaler or a distribution center. That is, FIG. 8 illustrates a state in which the crops are accumulated on a large truck at a factory or an agricultural cooperative in Kitakyushu being the departure point X and are transported to the wholesaler or distribution center near Tokyo on an expressway. Since Kitakyushu is about 1,000 km away from Tokyo, if the large truck travels at an average speed of 70 km/h, it takes nearly 15 hours. At the wholesaler or distribution center, sorting is performed to deliver the crops loaded on the large truck to each supermarket. This sorting also takes about one hour. Thereafter, the sorted crops are delivered to each supermarket by a small truck, and the transportation of the crops is completed. At that time, a time required for transportation may be estimated to be about 16 hours.

In contrast, FIG. 8(b) illustrates a transportation procedure of the traffic system TTS according to the present invention. By using this traffic system TTS, the crops loaded at the factory or farm in Kitakyushu (departure point X) are door-to-door transported to the supermarket in Tokyo (destination point Y), so that the time may be significantly shortened. That is, the crops collected at the farm are accumulated in a container with an automatic driving function (transfer box 100), and the transfer box 100 is loaded on the transfer unit 210 capable of moving at a high speed. As the transfer unit 210, a high-speed track such as the traveling carriage which travels on the fixed track and the Shinkansen may be adopted; they may move at an average speed of 200 km/h or higher (also applicable to 500 km/h, 1,000 km/h and the like). Therefore, it is possible to move 1,000 km within five hours, so that the time may be significantly shortened. Thereafter, the transfer box 100 is transferred to a low to medium-speed track to be transported to the vicinity of each supermarket being the destination point Y.

The transfer box 100 which moves to the suburbs of Tokyo is small freight transportation on which the crops to each supermarket being the destination point Y are loaded, so that this may be directly transported to each supermarket. As a result, a time required for the transportation may be estimated to be about 5.5 hours.

When the traffic system TTS according to the present invention is adopted, it is not necessary to carry out the transshipment operation conventionally performed at the wholesaler or distribution center, so that the transportation time may be shortened, and a labor cost may be reduced accordingly.

According to the traffic system TTS according to the present invention, the operation network of the existing operation system may be used. That is, since already laid railroads and overhead cables may be used, the traffic system TTS of the present invention may be realized without providing a new operation network. As a result, a cost when providing the operation network may be reduced significantly.

Furthermore, according to the traffic system TTS according to the present invention, the system management unit 400 provides the content information CI suitable for the user U, so that the user U may move to more interesting location to enrich one's journey.

Since the system management unit 400 is provided with the content reservation means 405, the user U may easily reserve the content.

According to the traffic system TTS according to the present invention, a standby place for the transfer box 100 may be easily secured. That is, while the user U handles tasks at the destination point Y, the transfer box 100 may stand by in a parking lot in a remote place, or the parking lot may be changed on the way. In addition to standing by in the parking lot, it is also possible to stand by while moving on the plurality of operation systems 200. Therefore, by registering the time and place in which the user U wants to use again, the transfer box 100 may select a standby method according to a situation and pass the time. In addition, this allows department stores, facilities and the like to use the parking lots mutually and reduce a waste in parking spaces.

According to the traffic system TTS according to the present invention, various transportation machines may be adopted as the transfer unit 210. That is, since a vehicle, an aircraft, a ship, a ropeway, an elevator, a monorail and the like may be adopted, the door-to-door movement may be realized in a wider range by using the transfer unit 210 suitable for geography and environment.

Since the EV vehicle EV adopted in the traffic system TTS according to the present invention may be charged on the transfer unit 210, there is less concern about charging, and since the movement between cities is performed at a high speed using the traffic system TTS, a cruising distance of the EV vehicle EV itself may be about 100 km. As a result, a capacity of the battery may be reduced, which may reduce a cost of the battery (about ⅕ of an expensive battery), and it is possible to contribute to the spread of the EV vehicles EV.

<Regarding Docking Mechanism 500>

Next, a specific configuration of the docking mechanism 500 which might be adopted in the traffic system TTS according to the present invention is described in detail with reference to FIGS. 9 to 16.

First, as an example of the docking plate 510, a configuration of a bottom surface plate 600 attached to a bottom surface side of the transfer box 100 is described with reference to FIGS. 9 and 10. Next, as an example of the docking unit 520, a configuration of a conveyor type unit 700 is described with reference to FIGS. 11 and 12, a configuration of a slide type unit 800 is described with reference to FIGS. 13 and 14, and a configuration of a suspension type unit 900 is described with reference to FIGS. 15 and 16.

Figure 9:
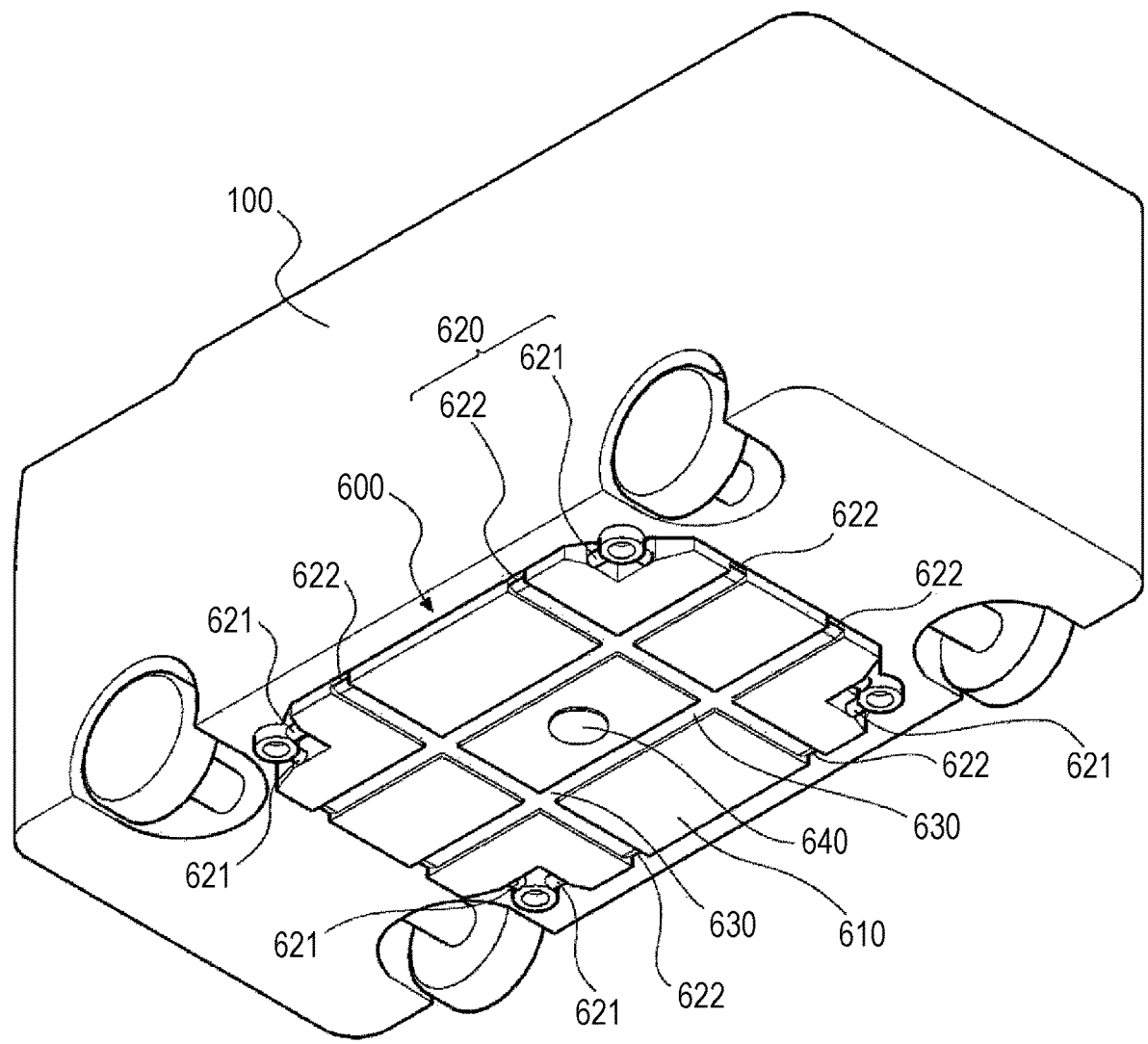
FIG. 9 is an external view of a docking plate in one embodiment of the present invention.

FIG. 9 is a perspective view of the bottom surface plate 600 attached to the bottom surface side of the transfer box 100 as seen from the bottom surface side, in which FIG. 10(a) is a bottom view and FIG. 10(b) is a side view. As illustrated in FIGS. 9 and 10, the bottom surface plate 600 is attached to the bottom surface of the transfer box 100 and arranged in a position in which this may be connected to the docking unit 520 provided on the transfer unit 210.

The bottom surface plate 600 includes a plate main body 610, a connection unit 620 (an example of the docking unit connection means 512) provided on a peripheral edge of the plate main body 610, a linear guide groove 630 provided on a surface of the plate main body 610, and a power reception unit 640 (an example of the power reception means 513) which receives electricity from the docking unit 520.

The plate main body 610 is desirably set to have a smaller area than that of the bottom surface of the transfer box 100 so as not to deviate from the bottom surface of the transfer box 100. Note that, although a substantially rectangular one is illustrated as the plate main body 610, a substantially disk-shaped one or a substantially elliptically-shaped one may also be adopted.

The connection unit 620 is the docking unit connection means 512 connected to the docking plate connection means 522 of the docking unit 520 and includes a columnar connection unit 621 and a convex connection unit 622. A pair of connection units 620 is provided at right and left symmetrical positions or front and rear symmetrical positions of the plate main body 610, and is configured to be able to connect and fix the plate main body 610 while interposing the same from both sides thereof.

The columnar connection units 621 are provided along the peripheral edge of the plate main body 610; for example, two pairs are provided in a longitudinal direction and two pairs are provided in a horizontal direction. That is, two groups of columnar connection units 621 extending in the horizontal direction of the plate main body 610 are arranged in pairs in front and rear symmetrical positions. In addition, two groups of columnar connection units 621 extending in the longitudinal direction of the plate main body 610 are arranged in pairs in right and left symmetrical positions. Note that, the number and size of the columnar connection units 621 are not limited. As illustrated in FIGS. 9 and 10, the columnar connection unit 621 may be formed into a cylindrical shape or a polygonal columnar shape. The columnar connection unit 621 is arranged in a position where a hook-shaped connection unit (docking plate connection means 522) of the docking unit 520 may be connected.

The convex connection units 622 are provided at the peripheral edge of the plate main body 610, and are provided in pairs in the longitudinal direction and the horizontal direction as is the case with the columnar connection units 621. The convex connection unit 622 has a shape protruding toward an outer side of the plate main body 610, and FIG. 10 illustrates a substantially "<"-shaped convex connection unit 622 formed of an upper tapered surface 623 and a lower tapered surface 624. The hook-shaped connection units (docking plate connection means 522) of the docking unit 520 fit the convex connection units 622 from both sides, thereby connecting the docking plate 510 to the docking unit 520.

Figure 11:
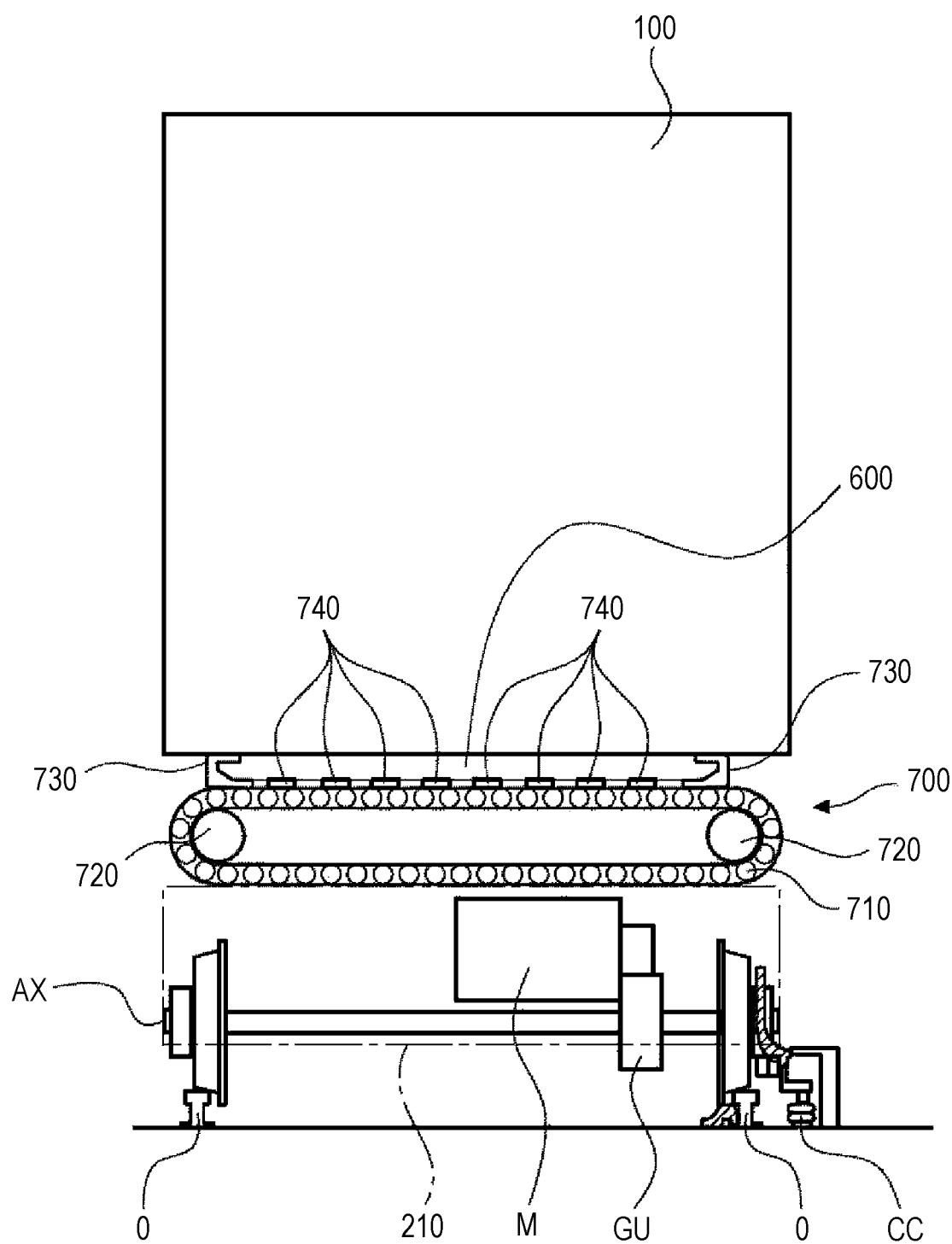
FIG. 11 is a view illustrating an example of a docking unit in one embodiment of the present invention.

Note that, although FIGS. 10 and 11 illustrate an example in which the convex connection unit 622 is provided at an end of the guide groove 630, this may be provided in any place of the peripheral edge of the plate main body 610. Furthermore, although the substantially "<"-shaped convex connection unit 622 formed of the upper tapered surface 623 and the lower tapered surface 624 is illustrated, it is only necessary that this has a shape to which the hook-shaped connection unit of the docking unit 520 may fit; for example, an inverted convex shape formed by providing a groove or the like may be adopted.

Note that, although the docking plate 510 in which both the columnar connection unit 621 and the convex connection unit 622 are formed is illustrated in this embodiment, it is naturally possible to adopt only one of them, and to adopt another commonly used connection structure.

The guide groove 630 is a concave groove provided on the surface of the plate main body 610, and is configured to male/female fit to a part of the docking unit 520 to position the relative position with respect to the transfer box 100 and to guide a moving direction of the transfer box 100. The guide grooves 630 are linearly formed in the longitudinal direction and the horizontal direction of the plate main body 610; two grooves are provided in the longitudinal direction and two grooves are provided in the horizontal direction. Note that the number of guide grooves 630 is not limited.

The lower tapered surface 624 inclined toward the transfer box 100 is formed on both ends of the guide groove 630.

By forming the tapered surface on the end of the guide groove 630 in this manner, the guide groove 630 may smoothly run on the docking unit 520, and impact on the passenger and freight in the transfer box 100 may be reduced.

Next, the docking unit 520 which may be coupled to the docking plate 510 is described in detail with reference to FIGS. 11 to 16. As main examples of the docking unit 520, three types of the conveyor type unit 700, the slide type unit 800, and the suspension type unit 900 are illustrated.

Figure 13:
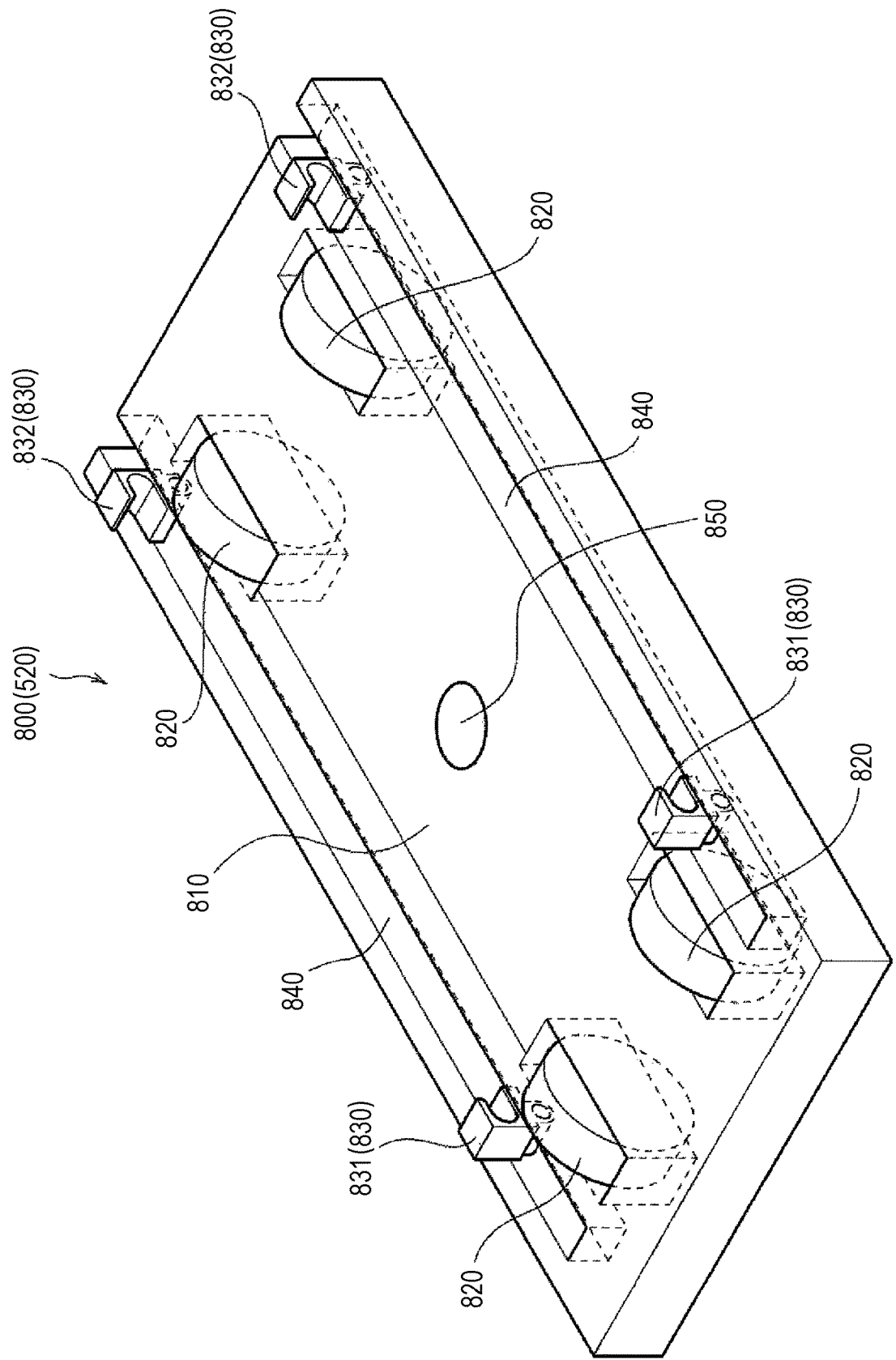
FIG. 13 is a view illustrating an example of the docking unit in one embodiment of the present invention.
Figure 14:
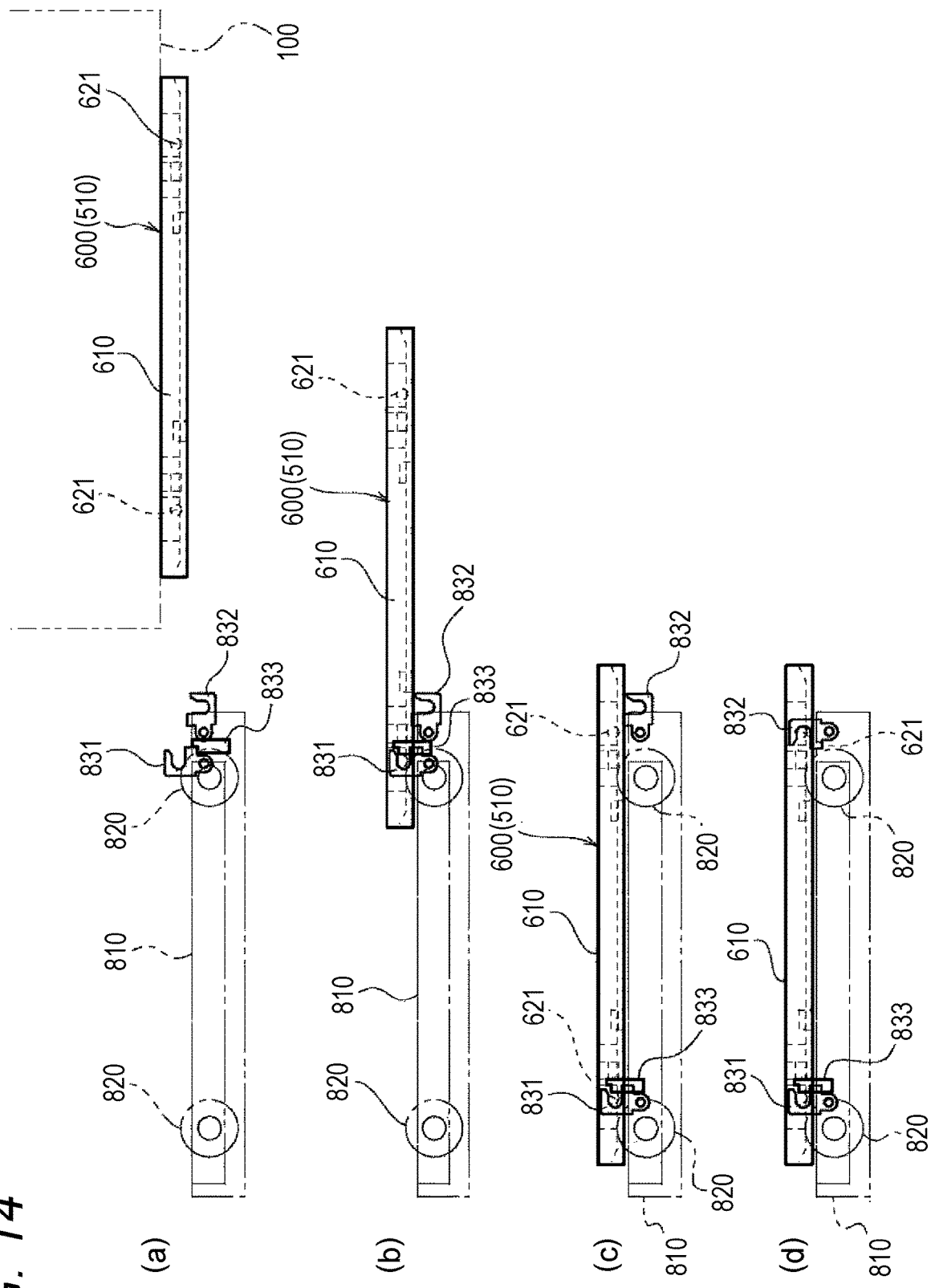
FIG. 14 is a view illustrating the transfer state of the transfer box in one embodiment of the present invention.
Figure 15:
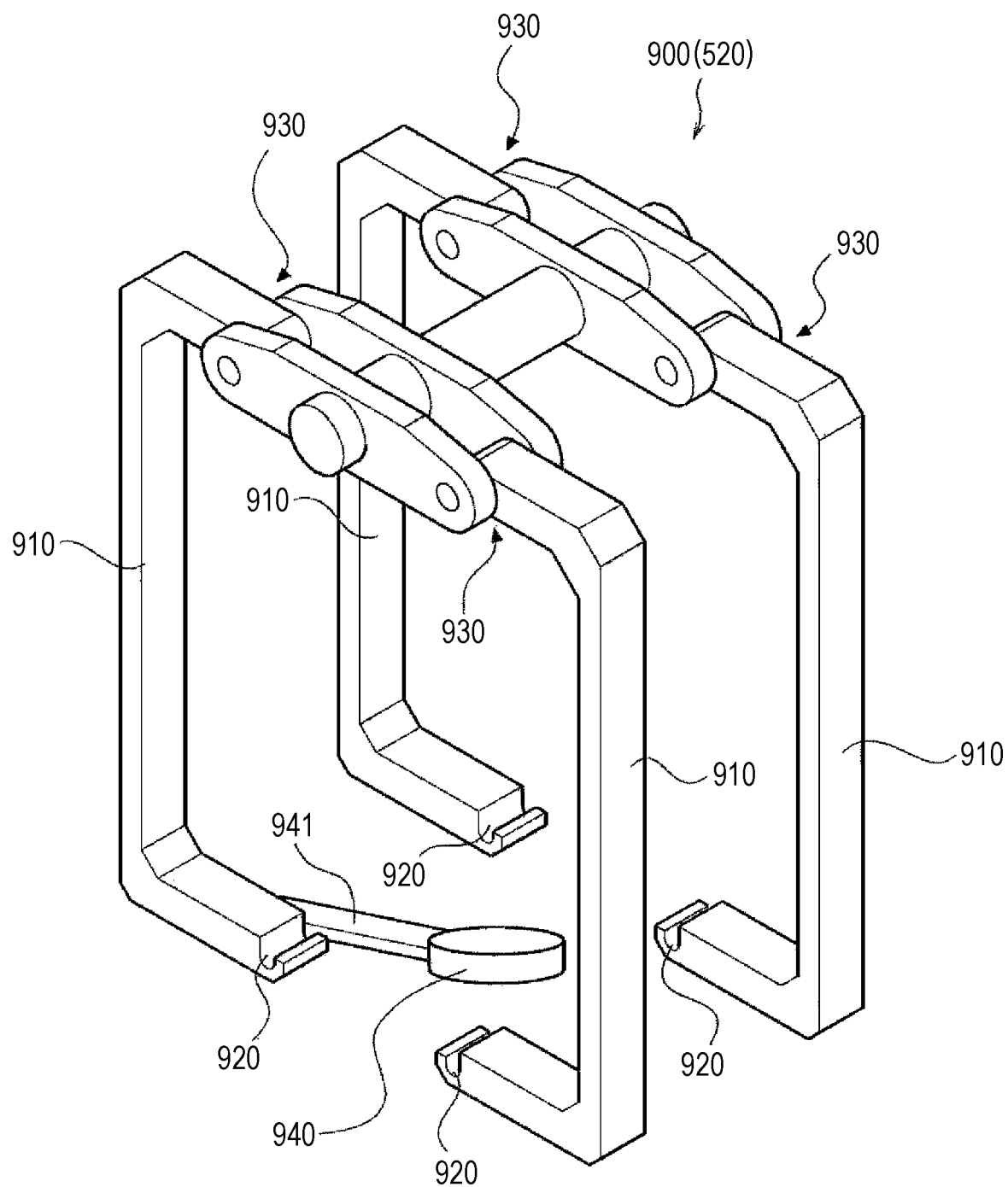
FIG. 15 is a view illustrating an example of the docking unit in one embodiment of the present invention.

FIGS. 11 and 12 are views illustrating the conveyor type unit 700 adopting the conveyor type. FIGS. 13 and 14 are views illustrating the slide type unit 800 adopting the slide type. FIGS. 15 and 16 are views illustrating the suspension type unit 900 adopting the suspension type.

As illustrated in FIG. 11, the conveyor type unit 700 is provided with a conveyor belt 710 on which the transfer box 100 is loaded and moved, a driving unit 720 which rotary drives the conveyor belt 710 along the route, a hook-shaped connection unit 730 which may be connected to the connection unit 620 of the bottom surface plate 600, and a convex body 740 male/female fitted to the guide groove 630.

The hook-shaped connection unit 730 and the convex body 740 are fixedly arranged on the conveyor belt 710, the hook-shaped connection unit 730 and the convex body 740 arranged in positions corresponding to the convex connection unit 622 and the guide groove 630, respectively.

FIG. 12 illustrates a state in which the transfer box 100 is transferred from one transfer unit 210A to the other transfer unit 210B using the conveyor type unit 700.

First, as illustrated in FIG. 12(a), when the conveyor belt 710 of one transfer unit 210A is rotary driven, the transfer box 100 moves in a direction toward the other (transfer destination) transfer unit 210B, and a hook-shaped connection unit 730A fitted to the connection unit 620 (the convex connection unit 622 in FIG. 12) on a side in a travel direction is detached.

Next, as illustrated in FIG. 12(b), the connection unit 620 reaches to fit to a hook-shaped connection unit 730B on the other (transfer destination) transfer unit 210B.

Then, as illustrated in FIG. 12(c), the conveyor belt 710 of the transfer unit 210A and that of the transfer unit 210B are rotary driven, so that the transfer box 100 is transferred to the transfer unit 210B.

Finally, the hook-shaped connection units 730B of the transfer unit 210B fit to be fixed to the connection units 620 on both sides of the bottom surface plate 600.

Although not illustrated in FIGS. 9 and 10, a power transmission unit which supplies power to the power reception unit 640 of the bottom surface plate 600 may be further provided.

Note that, FIG. 11 illustrates the traveling carriage moving on the track O as the transfer unit 210, the traveling carriage including a motor M driven by electricity supplied from the current collector CC and a gear unit GU which transmits power of the motor M to an axle AX.

Next, the slide type unit 800 illustrated in FIGS. 13 and 14 is described.

The slide type unit 800 includes a unit main body 810, a rotating body 820 which moves the transfer box 100 by rotation, a hook-shaped connection unit 830 which fits to the connection unit 620, a moving route 840 on which the hook-shaped connection unit 830 moves on the unit main body 810, and a power transmission unit 850 which supplies power to the power reception unit 640 of the bottom surface plate 600.

The rotating body 820 is arranged in a position corresponding to the guide groove 630 and rotates while fitting in the guide groove 630, so that the bottom surface plate 600 moves along the guide groove 630.

The hook-shaped connection unit 830 includes a moving hook-shaped connection unit 831 formed into a substantially "]"-shaped shape having an opening on one side, arranged in a position where this may fit to the connection unit 620 of the bottom surface plate 600, and moves along the moving route 840, a fixing hook-shaped connection unit 832 which fixes the connection unit 620 on the opposite side, and a fixing plate 833 which closes the opening of the moving hook-shaped connection unit 831 to fix.

FIG. 14 illustrates a state in which the bottom surface plate 600 is fixed to the slide type unit 800.

First, in a state before being fixed, as illustrated in FIG. 14(a), the moving hook-shaped connection unit 831 is arranged so as to protrude above the unit main body 810 in order to receive the connection unit 620 (the columnar connection unit 621 in FIG. 14) on one end side of the bottom surface plate 600, and the fixing hook-shaped connection unit 832 is fixed in a fallen state so as not to come into contact with the bottom surface plate 600.

Next, as illustrated in FIG. 14(b), the bottom surface plate 600 moves toward the slide type unit 800, the rotating body 820 fits in the guide groove 630, and the moving hook-shaped connection unit 831 fits into the columnar connection unit 621. At that time, the fixing plate 833 closes the opening of the moving hook-shaped connection unit 831 to be fixed.

Thereafter, as illustrated in FIG. 14(c), the bottom surface plate 600 moves onto the unit main body 810 as the rotating body 820 rotates. This may also be moved onto the unit main body 810 by using power of the fixed moving hook-shaped connection unit 831.

Finally, as illustrated in FIG. 14(d), by raising the fixing hook-shaped connection unit 832 and fitting the same to the connection unit 620 on the other end side, the docking plate 510 is fixed to the unit main body 522a.

Note that, when transferring to another transfer unit 21, the fixation may be released in a reverse procedure.

Next, the suspension type unit 900 illustrated in FIGS. 15 and 16 is described.

FIG. 15 illustrates a perspective view of the suspension type unit 900, in which FIG. 16(a) illustrates a bottom view, FIG. 16(b) illustrates a side view, and FIG. 16(c) illustrates a front view.

The suspension type unit 900 is provided with an arm unit 910, a hook-shaped connection unit 920 provided on a distal end side of the arm unit 910, a rotation unit 930 provided on a proximal end side of the arm unit 910 which rotates the arm unit 910, and a power transmission unit 940 which supplies power to the power reception unit 640 of the docking plate 510.

The arm unit 910 is formed along the outer shape of the transfer box 100, and is formed in a "]"-shape as a whole so as to be able to hold the transfer box 100 from both sides.

The hook-shaped connection unit 920 is provided in a position corresponding to the columnar connection unit 621 of the bottom surface plate 600, and is configured to be able to fit to the columnar connection unit 621 from below.

The power transmission unit 940 includes a rotating plate 941 for getting close to the power reception unit 640 of the bottom surface plate 600. The power transmission unit 940 is provided on one end side of the rotating plate 941, and the other end side is connected to the arm unit 910. By rotating the rotating plate 941, the power transmission unit 940 may get close to the power reception unit 640.

According to the docking mechanism 500 according to this embodiment, since the docking plate 510 of the same standard is configured to be able to couple to a plurality of docking units 520, various transfer boxes 100 may be easily adopted.

That is, by simply attaching the docking plate 510, the container, the vehicle and the like may be used as the transfer box 100 applicable to the traffic system TTS according to the present invention.

In this manner, the transfer box 100 may be easily manufactured without processing the box itself.

In addition, since the standard may be easily unified by adopting the docking plate 510, it is possible to improve accuracy when transferring to each transfer unit 210 rather than processing each box.

In addition, according to the docking plate 510 according to this embodiment, since the columnar connection unit 621 formed into the columnar shape is adopted, a range of the docking unit 520 which may be coupled may be increased. That is, the hook-shaped connection unit may fit to the columnar connection unit 621 in a plurality of directions. For example, a suspension type docking unit 520 which couples to the hook-shaped connection unit from below may be adopted in addition to the conveyor type and the slide type which couple to the hook-shaped connection unit from the side.

<Regarding Transfer Unit Connection Means 214>

Figure 17:
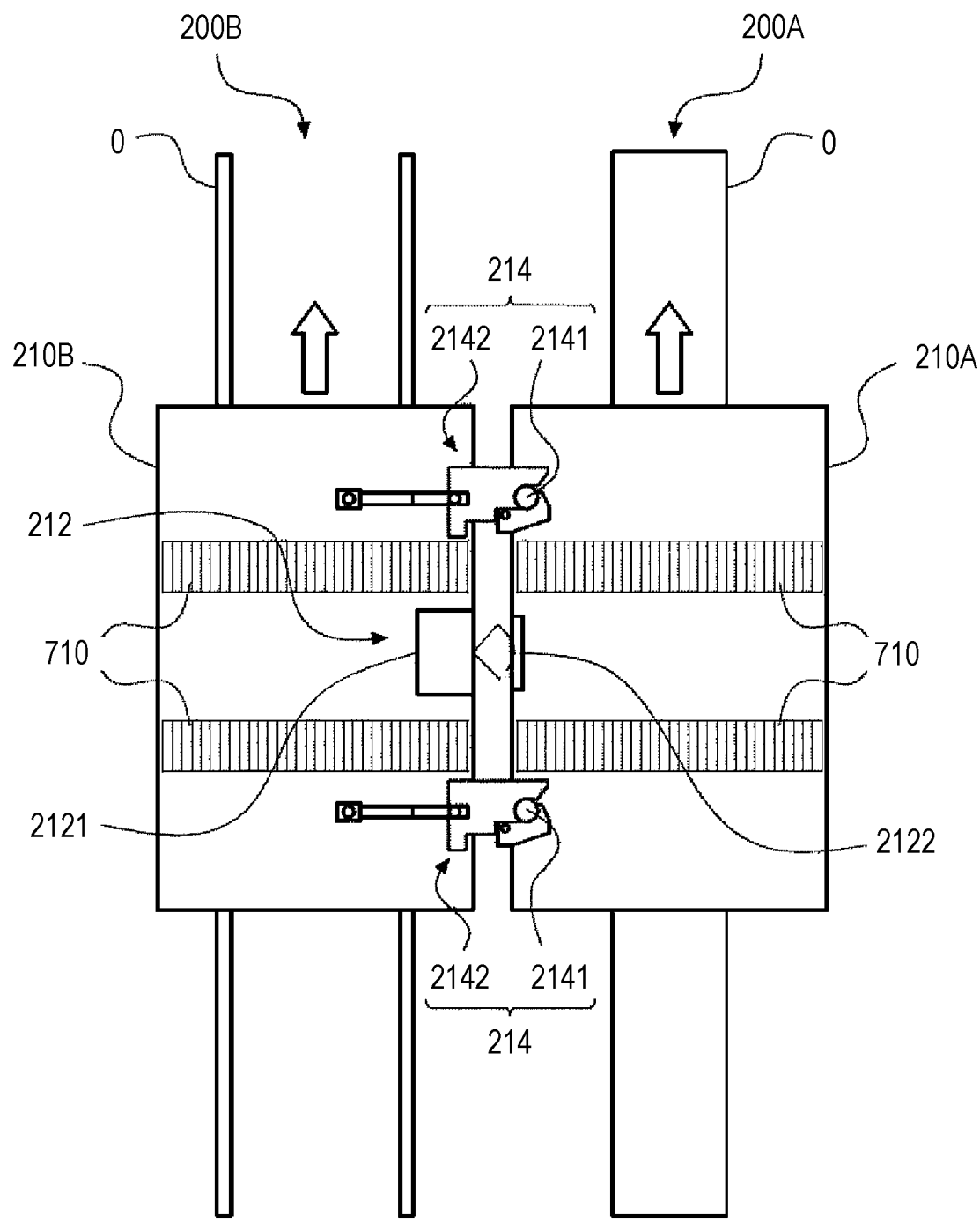
FIG. 17 is a view illustrating an example of a transfer unit connection means in one embodiment of the present invention.
Figure 18:
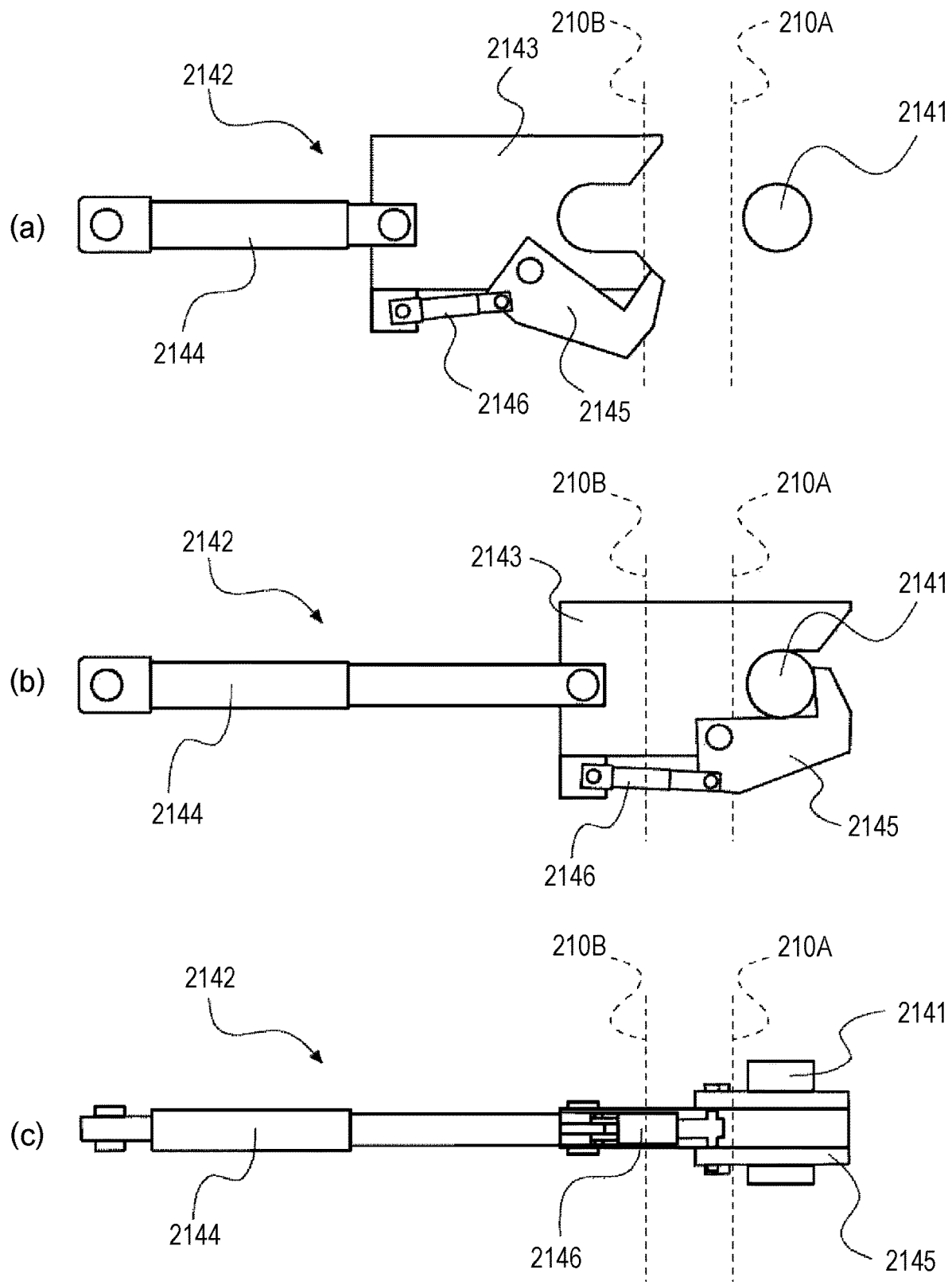
FIG. 18 is a view illustrating an example of the transfer unit connection means in one embodiment of the present invention.
Figure 19:
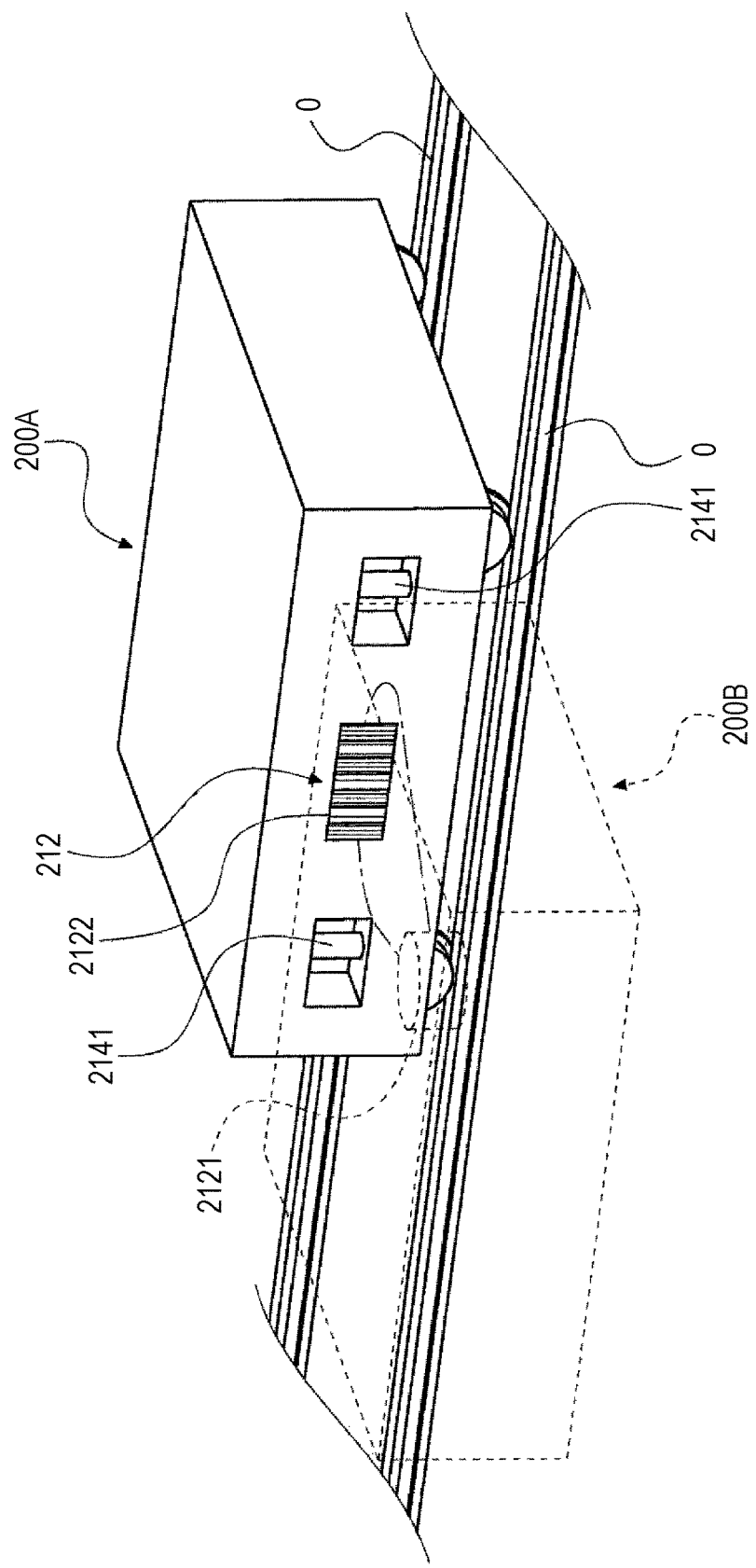
FIG. 19 is a view illustrating an example of the transfer unit connection means in one embodiment of the present invention.

Next, a specific configuration of the transfer unit connection means 214 which might be adopted in the traffic system TTS according to the present invention is described in detail with reference to FIGS. 17 to 19. FIG. 17 illustrates a plan view of the transfer unit 210 in a state of being connected using the transfer unit connection means 214. FIG. 18 illustrates an unconnected state and a connected state of the transfer unit connection means 214. FIG. 19 illustrates a state in which the transfer units 210 run side by side before connection and perform positioning in a position where the transfer unit connection means 214 may connect.

The transfer unit connection means 214 includes a connecting shaft 2141 provided on one transfer unit 210 and a connector 2142 connected to the connecting shaft 2141. In FIGS. 17 to 19, an example is illustrated in which the transfer units 210A and 210B are provided with the connecting shaft 2141 and the connector 2142, respectively; however, they may also be provided inversely or both of them may be provided on each transfer unit.

The connector 2142 is provided with a guide plate 2143 having an opening into which the connecting shaft 2141 is fitted, a first cylinder 2144 which expands and contracts the guide plate 2143 in a direction of the connecting shaft 2141, a lock plate 2145 which fixes the guide plate 2143 when this fits into the connecting shaft 2141, and a second cylinder 2146 which rotates the lock plate 2145.

FIG. 18(a) illustrates the non-connected state of the transfer unit connection means 214 in which the first cylinder 2144 and the second cylinder 2146 are in a contracted state. Therefore, the guide plate 2143 is accommodated in the transfer unit 210A, and the opening of the guide plate 2143 is opened.

FIGS. 18(b) and 18(c) illustrate the connected state of the transfer unit connection means 214 in which the first cylinder 2144 and the second cylinder 2146 are expanded, and the connector 2142 is fixed to the connecting shaft 2141. That is, the connecting shaft 2141 is fitted into the opening of the guide plate 2143, and the connecting shaft 2141 is surrounded by the guide plate 2143 and the lock plate 2145 to be fixed.

FIG. 19 illustrates a state in which the transfer units 210A and 210B to be connected run side by side and perform the positioning by the transfer unit relative position measurement means 212.

The transfer unit relative position measurement means 212 includes a laser range finder 2121 and a measurement plate 2122.

In the measurement plate 2122, a reflection portion and a low-reflection portion are alternately arranged; it is configured such that, when the laser range finder 2121 irradiates the measurement plate 2122 with a laser, a relative position between the carriages may be measured from a width and a distance of the reflection portion.

Note that the laser range finder 2121 and the measurement plate 2122 illustrated in FIGS. 18 and 19 are an example of the transfer unit relative position measurement means 212, and it is of course possible to use a conventional relative position measurement means.

<Transportation Method in Traffic System According to the Present Invention>

Finally, a transportation method of the traffic system TTS according to the present invention is described in detail with reference to FIGS. 20 to 22.

Figure 20:
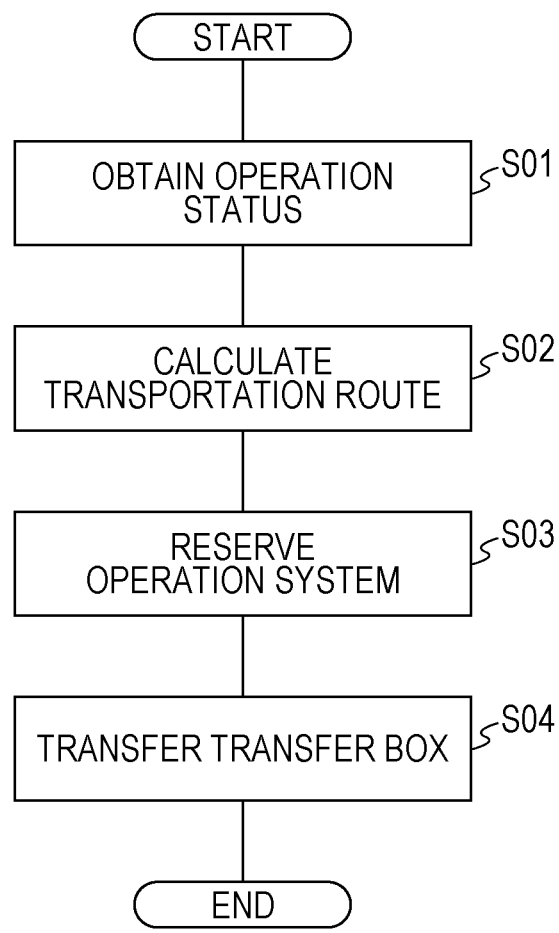
FIG. 20 is a flowchart illustrating each step in a transportation method according to the present invention.

FIG. 20 illustrates a flowchart of the transportation method according to the present invention. FIG. 21 illustrates a flow of a transfer reserving step in the transportation method according to the present invention. FIG. 22 illustrates a flow of a transferring step in the transportation method according to the present invention.

The transportation method according to the present invention is the transportation method of transporting the transfer box 100 from the departure point X to the destination point Y via a plurality of operation systems 200, and includes, as illustrated in FIG. 20, an operation status obtaining step S01 of obtaining the operation status of the each operation system 200, a route calculating step S02 of calculating the transportation route TR of the transfer box 100, a transfer reserving step S03 of reserving the operation system 200 used on the transportation route TR, and a transferring step S04 of transferring the transfer box 100.

Note that the system management unit 400 performs the operation status obtaining step S01, the route calculating step S02, and the transfer reserving step S03, and the operation system 200 performs the transferring step S04.

Figure 21:
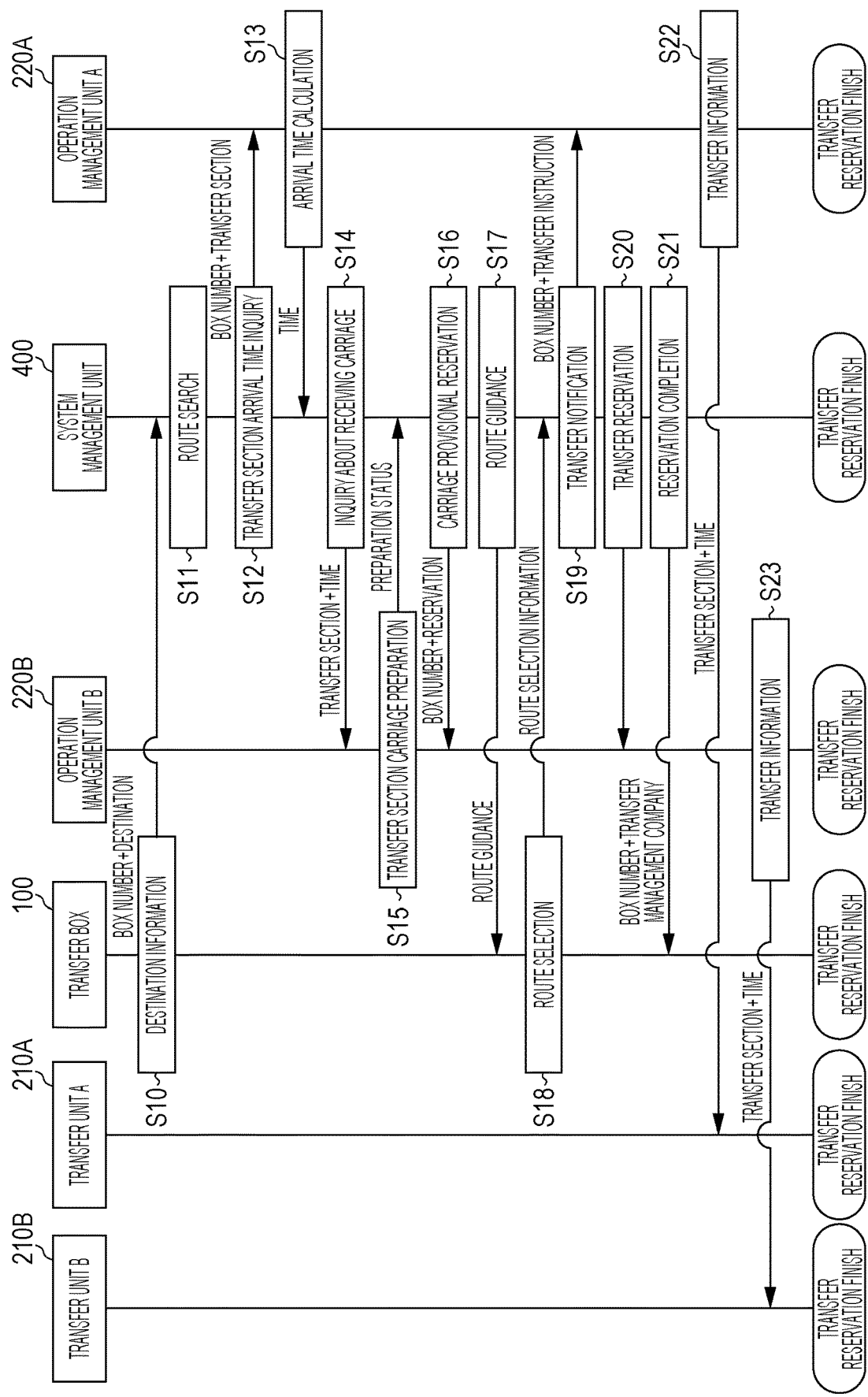
FIG. 21 is a view illustrating a transfer reserving step in the transportation method according to the present invention in detail.

FIG. 21 is a view illustrating an example of procedures of the route calculating step S02 and the transfer reserving step S03 in detail. Note that the transfer unit 210A and the operation management unit 220A indicate the operation system 200A on which the transfer box 100 before the transfer is loaded, and the transfer unit 210B and the operation management unit 220B indicate the operation system 200B to which the transfer box 100 transfers.

First, based on the box information BI input by the user U, the system management unit 400 is notified of destination information and a box number from the transfer box 100 (step S10). The system management unit 400 searches for a route based on the destination information and the operation status received from the operation system 200, and creates the transportation route TR (step S11). Then, the system management unit 400 sends inquires to the operation management unit 220A about time at which the transfer unit 210A reaches the transfer section TS based on the transportation route TR (step S12). The operation management unit 220A calculates the time at which the transfer unit 210A reaches the transfer section TS, and notifies the system management unit 400 of the same (step S13).

Next, the system management unit 400 sends inquires to the operation management unit 220B about the transfer unit 210B to which it is possible to transfer from the transfer unit 210A (step S14). The operation management unit 220B which receives the inquiries prepares the transfer unit 210B and notifies the system management unit 400 of a preparation status (step S15). Upon receiving this notification, the system management unit 400 provisionally reserves the transfer unit 210B which meets the condition (step S16).

After that, the system management unit 400 notifies the transfer box 100 of the transportation route TR and performs route guidance (step S17), and the user U selects the intended transportation route TR and determines the route (step S18). After selecting the transportation route TR by the user U, the system management unit 400 notifies the operation management unit 220A of a transfer instruction together with the box number (step S19), notifies the operation management unit 220B of the transfer reservation (step S20), and notifies the transfer box 100 that the reservation is completed (step S21). Thereafter, each transfer unit is notified of the determined transfer information from each operation management unit (steps S22 and S23).

In this manner, the route calculating step S02 and the transfer reserving step S03 are completed. These steps may be performed before the transfer box 100 is transported, or may be performed while the transfer box 100 is transported.

Next, a flow of the transferring step S04 in which the transfer box 100 transfers from the transfer unit 210A to the transfer unit 210B is described in detail with reference to FIG. 21.

The transfer unit 210A notifies the operation management unit 220A that this arrives at the transfer section TS (step S24), and the operation management unit 220A notifies the operation management unit 220B that the transfer unit 210A arrives at the transfer section TS (step S26). The transfer unit 210B also notifies the operation management unit 220B that transfer preparation is completed (step S25).

The operation management unit 220B waits for the instruction and issues a transfer start instruction to the transfer unit 210B (step S27). In response to this instruction, the transfer unit 210B starts traveling the carriage, and runs side by side with the transfer unit 210A and communicates therewith (step S29). Thereafter, they travel synchronously at the same travel speed (step S30), and the transfer units 210 are docked (connected) with a carriage docking device (transfer unit connection means 214) (step S31). After docking, transfer of the transfer box 100 is started.

First, the transfer unit 210A unlocks a front stage of the transfer box 100 (step S32), and operates the transfer device (transfer means 300) (step S33). The transfer unit 210B notifies the transfer unit 210A that the transfer box 100 arrives at the connection unit of the transfer unit 210B to lock (step S34), and unlocks a rear stage of the transfer unit 210A (step S35).

The transfer box 100 arrives at an end point of the transfer unit 210B (step S36), and the transfer box 100 is locked to the transfer unit 210B (step S37). Thereafter, the transfer units 210 notify the operation management units 220A and 220B, respectively, that the transfer is completed (step S38 and step S41), and the operation management units 220A and 220B notify the system management unit 400 that the transfer is completed (step S39 and step S42), thereby finishing the transfer of the transfer box 100.

Note that, although it is illustrated in FIG. 22 that the transfer box 100 is transferred while the transfer units 210 travel at the transferring step S04, it is also possible to transfer the transfer box 100 in a state in which the transfer units 210 stop.

REFERENCE SIGNS LIST

100 Transfer box
200 Operation system
210 Transfer unit
220 Operation management unit
300 Transfer means
400 System management unit
500 Docking mechanism
510 Docking plate
520 Docking unit
600 Bottom surface plate
700 Conveyor type unit
800 Slide type unit
900 Suspension type unit
TTS Traffic system
TS Transfer section
TR Transportation route
CI Content information
BI Box information
UI User information
U User

The invention claimed is:

1. A traffic system comprising:
an electric vehicle capable of accommodating a passenger and/or freight;
a plurality of operation systems capable of transporting the electric vehicle;
a transfer means which transfers the electric vehicle from one operation system to another operation system; and
a system management unit which communicates with the plurality of operation systems to manage a transportation status of the electric vehicle,
wherein the operation system includes a transfer unit on which the electric vehicle is loaded, and an operation management unit which manages an operation status of the transfer unit,
a docking mechanism that is configured to connect the transfer box electric vehicle to the transfer unit,
wherein the docking mechanism includes a docking plate provided on an exterior surface of a bottom of the electric vehicle, and a docking unit provided on exterior surface of a top of the transfer unit and that is configured to be removably connectable to the docking plate,
wherein the docking plate includes a plate main body, a docking unit connection means provided on a peripheral edge of the plate main body, and a guide groove provided on a surface of the plate main body, and
the docking unit includes a docking plate connection means that is configured to be connected to the docking unit connection means, and a convex portion which fits into the guide groove.

2. The traffic system according to claim 1, wherein the transportation status is information including a transportation route of the electric vehicle.

3. The traffic system according to claim 1, wherein the transfer unit includes a transfer unit connection means which connects to another transfer unit.

4. The traffic system according to claim 1, wherein the system management unit includes an operation status obtaining means which obtains the operation status, a transportation route creation means which creates the transportation route of the electric vehicle, and an operation system reservation means which reserves the operation system used on the transportation route.

5. The traffic system according to claim 1, wherein the system management unit includes a content information selection means which selects content information based on user information of a user who uses the electric vehicle, and provides the content information to the user.

6. The traffic system according to claim 5, wherein the system management unit includes a content reservation means which reserves content based on the content information.

7. The traffic system according to claim 1, wherein at least a pair of docking unit connection means is arranged in front and rear symmetrical positions in a horizontal direction of the plate main body.

8. The traffic system according to claim 1, wherein at least a pair of docking unit connection means is arranged in right and left symmetrical positions in a longitudinal direction of the plate main body.

9. The traffic system according to claim 1, wherein the docking unit connection means is a columnar connection unit formed into a columnar shape.

10. The traffic system according to claim 1, wherein the docking unit includes a conveyor belt capable of transferring the electric vehicle.

11. The traffic system according to claim 1, wherein the docking unit includes a rotating body capable of transferring the electric vehicle.

12. The traffic system according to claim 1, wherein the docking unit includes an arm unit capable of suspending the electric vehicle.

13. The traffic system according to claim 1, wherein the docking unit is provided with a power transmission means, and the docking plate is provided with a power reception means.

14. The traffic system according to claim 1, wherein the docking plate is further provided with an electricity storage means which stores electricity.

15. The traffic system according to claim 1, wherein the electric vehicle includes a moving wheel capable of self-propelling.

16. A transportation method of transporting the electric vehicle from a departure point to a destination point via the plurality of operation systems by the traffic system according to claim 1, the method comprising:
a route calculating step of calculating a transportation route of the electric vehicle;
a transfer reserving step of reserving the operation system used on the transportation route; and
a transferring step of transferring the electric vehicle.

17. The transportation method according to claim 16, wherein the transferring step includes a coupling step of coupling one transfer unit with another transfer unit.

18. The transportation method according to claim 16, wherein, at the transferring step, the electric vehicle is transferred while the transfer units travel.

* * * * *